US012745695B2

(12) United States Patent
Molder et al.

(10) Patent No.: US 12,745,695 B2
(45) Date of Patent: Sep. 29, 2026

(54) RESIDUE MANAGEMENT SYSTEM FOR AN AGRICULTURAL ROW UNIT ASSEMBLY

(71) Applicant: CLEAN SEED AGRICULTURAL TECHNOLOGIES LTD., Burnaby (CA)

(72) Inventors: Daniel Kirk Stanley Molder, Regina (CA); Robert Sydney Ruff, Burnaby (CA); Gordon Blair Wilson, Burnaby (CA); Graeme Lempriere, Burnaby (CA); Colin Michael Rush, Burnaby (CA); Manmohanjit Singh Jheetey, Burnaby (CA); Ramesh Thirumalai, Burnaby (CA)

(73) Assignee: CLEAN SEED AGRICULTURAL TECHNOLOGIES LTD. (CA)

( * ) Notice: Subject to any disclaimer, the term of this patent is extended or adjusted under 35 U.S.C. 154(b) by 317 days.

(21) Appl. No.: 18/557,669

(22) PCT Filed: Apr. 29, 2022

(86) PCT No.: PCT/CA2022/050664
§ 371 (c)(1),
(2) Date: Oct. 27, 2023

(87) PCT Pub. No.: WO2022/226661
PCT Pub. Date: Nov. 3, 2022

(65) Prior Publication Data

US 2024/0206373 A1 Jun. 27, 2024

Related U.S. Application Data

(60) Provisional application No. 63/293,425, filed on Dec. 23, 2021, provisional application No. 63/182,417, filed on Apr. 30, 2021.

(30) Foreign Application Priority Data

Apr. 30, 2021 (CA) ................................ CA 3116699
Dec. 23, 2021 (CA) ................................ CA 3143782

(51) Int. Cl.
*A01C 5/06* (2006.01)
*A01C 7/00* (2006.01)
*A01C 7/08* (2006.01)
*A01C 7/20* (2006.01)

(52) U.S. Cl.
CPC .............. *A01C 7/203* (2013.01); *A01C 5/064* (2013.01); *A01C 7/006* (2013.01); *A01C 7/08* (2013.01)

(58) Field of Classification Search
CPC ........... A01C 5/064; A01C 7/006; A01C 7/08; A01C 7/203
See application file for complete search history.

(56) References Cited

U.S. PATENT DOCUMENTS 2,556,072 A 6/1951 Bradley
3,752,238 A 8/1973 Chilton
(Continued)

FOREIGN PATENT DOCUMENTS

CA 2089705 A1 11/1993
EP 170140 A * 2/1986
(Continued)

OTHER PUBLICATIONS

Canadian Intellectual Property Office, International Search Report, mailed on Aug. 1, 2022 in relation to PCT/CA2022/050664, 6 pages, ISA/CA Gatineau, Quebec, Canada.
(Continued)

*Primary Examiner* — Jamie L Mcgowan
(74) *Attorney, Agent, or Firm* — Field LLP; Michael Sharp

(57) ABSTRACT

A residue management system for a row unit assembly includes a coulter disc and an opener blade wherein, when
(Continued)

the row unit assembly is travelling in a forward direction with the opener blade and coulter disc engaging ground, a resiliently biased swing arm resiliently maintains the coulter disc in a default position adjacent a curved leading edge of the opener blade. In some embodiments, at least one mower is mounted ahead of the row unit assembly to provide mulched crop residue for processing by the coulter disc. The system may also include a product redirection system and a modular opener assembly for selectively configuring the placement of agricultural product in a furrow.

15 Claims, 18 Drawing Sheets

(56) References Cited

U.S. PATENT DOCUMENTS

| | | | | |
|---|---|---|---|---|
| 4,031,834 A * | 6/1977 | Klenke | A01C 7/205 111/163 |
| 6,182,587 B1 | 2/2001 | Lempriere | |
| 6,408,772 B1 | 6/2002 | Lempriere | |
| 7,044,047 B1 | 5/2006 | Bennett et al. | |
| 8,910,724 B2 * | 12/2014 | Borgmann | A01D 33/14 172/139 |
| 9,907,224 B2 | 3/2018 | Rosengren et al. | |
| 2022/0240437 A1 * | 8/2022 | Collin | A01C 5/064 |

FOREIGN PATENT DOCUMENTS

| | | | |
|---|---|---|---|
| WO | 2014183182 A1 | 11/2014 | |
| WO | WO-2021002798 A1 * | 1/2021 | A01C 5/064 |

OTHER PUBLICATIONS

Canadian Intellectual Property Office, Written Opinion of the Internal Searching Authority, mailed on Aug. 1, 2022 in relation to PCT/CA2022/050664, 6 pages, ISA/CA Gatineau, Quebec, Canada.

* cited by examiner

RESIDUE MANAGEMENT SYSTEM FOR AN AGRICULTURAL ROW UNIT ASSEMBLY

CROSS-REFERENCE TO RELATED APPLICATIONS

This application claims the benefit of U.S. Provisional patent application No. 63/182,417 and Canadian patent application no. 3,116,699, both filed on Apr. 30, 2021 and entitled "Residue Management System for a Seeder Row Unit Assembly", and this application claims the benefit of U.S. Provisional patent application No. 63/293,425 and Canadian patent application no. 3,143,782, both filed on Dec. 23, 2021 and entitled "Residue Management System for an Agricultural Row Unit Assembly", all of which are incorporated herein by reference.

FIELD

The present disclosure relates to systems for managing crop residue on a seeder or planter row unit assembly.

BACKGROUND

Agricultural implements, such as seeders, planters and the like (collectively herein referred to as seeders or seeder/planters), may incorporate row unit assemblies having relatively narrow spacing between each assembly. For example, not intending to be limiting, some row unit assemblies may be spaced apart so as to have 12 inches between each row, and furthermore, such row unit assemblies may include opener blades that create a paired row, having four inches between the pair of rows. Such seeders, configured for no-till farming, may advantageously provide for ideal agronomic conditions for most crops, for example by reducing the loss of carbon and moisture into the atmosphere during the seeding process.

However, the applicant has observed that no-till machines with narrow row spacing are associated with an increased risk of field residue becoming wedged in and around the opener blades, including residue build up in the space between a leading coulter disc and the leading edge of the opener blade. The applicant has observed that when even a small buildup of residue occurs on a single opener blade, such buildup may quickly lead to a large residue buildup spanning across multiple adjacent opener blades. When this occurs during seeding operations, the residue buildup may result in a wide swath of bare soil in which no seeding has occurred. Typically, the operator is required to monitor for problematic residue buildup occurring and periodically halt the seeding operations in order to clear the residue buildup. Each halting of seeding operations to clear residue buildup on the opener blades results in downtime for the seeder and increases the time required to complete seeding operations. The problem is exacerbated when crop residue may include upstanding residue of varying heights. One example, not intending to be limiting, occurs with rice crops where the crop residue may be sufficiently high, for example 16-18 inches high, to be a problem for coulter wheels which may be simply incapable of sufficiently cutting or otherwise processing such residue.

A coulter disc is typically positioned in front of the opener blade for facilitating the opening of a furrow in the ground, into which furrow the opening blade is pulled by the seeder so as to deposit agricultural products in the furrow, which agricultural products may include seeds and pelletized fertilizer or nutrients. The applicant has found that the trailing circumferential edge of the coulter disc is optimally placed at a distance of substantially ¼ inches (6.4 mm) apart from, and in-line with, the opener blade. Additionally, the coulter disc optimally extends beneath the bottom of the opener blade at a depth of substantially ⅜ inches (9.5 mm). However, the serrated teeth of the coulter disc will wear over time with use, therefore requiring replacement of the coulter disc, or periodic adjustment of the coulter disc to bring it closer to the opener blade and to penetrate further into the ground, so as to maintain the preferably, approximately ¼ inch placement apart from the opener blade, and penetrating into the ground at a depth of approximately ⅜ inches.

Traditional opener blades are of a unitary construction, typically made of an iron casting. Over time, an opener blade will wear down and eventually require replacement. In some cases, the tip and/or the tail of the opener blade may wear out faster than the body of the opener blade. When the opener blade is of unitary construction, the entire opener blade must be replaced when either the tip or the tail become too worn. Furthermore, if an operator wishes to have different configurations of product placement within the furrow, for example having a paired row that is spaced three inches apart in the lateral direction as opposed to spaced four inches apart in the lateral direction, an entirely separate opener blade must be installed on the seeder to provide for such different configurations of paired rows.

An opener blade may be fed by a metering pod, the pod typically including at least four different metering devices for dispensing four different types of agricultural product through the opener blade and into the ground. As described in the Applicant's U.S. Pat. No. 9,907,224, the entirety of which is incorporated herein by reference, agricultural products are fed from metering assemblies, via a flow re-director, into a manifold, and then into a corresponding opener having conduits to transport the agricultural products into the soil. The flow re-director and manifold provide for blending of combinations of agricultural products for each opener, according to a field prescription. The operator of the seeder may configure where each product is deposited in the furrow, as the opener blade includes at least three or four different outlets that are positioned on different portions of the opener blade, by selecting the product to be supplied to each particular metering device, as each metering device is in fluid communication with a corresponding outlet of the opener blade through a series of conduits or flexible hoses. In this prior system, the operator must use the metering device that corresponds to the desired outlet on the opener blade, or else may manually configure which meter feeds each outlet in the corresponding opener blade by manually switching the flexible hoses leading from each meter to the opener blade, in order to deposit the selected agricultural product through the desired outlet on the opener blade. Furthermore, the applicant's previous designs of an opener blade as described in applicant's U.S. Pat. Nos. 6,182,587 and 6,408,772, the entireties of which are incorporated herein by reference, are limited to three furrow placements for three different agricultural products.

SUMMARY

For use in managing crop residue, which may range in height from short to tall, in addition to or separate from the herein mentioned improvements, a crop residue mower may be mounted directly ahead of corresponding row units on a seeder/planter to pre-mulch the crop residual so as to be then processed by the corresponding coulter discs. The crop residue may include, for example, and not intending to be limiting, upstanding residue which stands higher than the mower. In one embodiment, the mower is a mower having a deck housing, such as illustrated in the accompanying Figures, enclosing at least one blade or a plurality of chains or cables rotating in a horizontal plane. As used herein, residue which is taller than the mower means that at least some of the upstanding crop residue stands higher than the deck housing.

The present residue management system thus, in one aspect, may include a mower mounted ahead of a coulter disc mounted to a swing arm. A tension spring urges the swing arm into a default position that, for example, positions the coulter disc at ¼ of an inch from the opener blade, as measured at the tip of the opener blade, and so as to penetrate the ground beneath the coulter disc by ⅜ of an inch. The swing arm may also include a default stop and a forward stop for limiting movement of the swing arm. On one embodiment the gap between the coulter disc and the opener blade is preferably ¼ of an inch as measured at the tip, the gap opening up to a distance of approximately ⅜ of an inch adjacent the upper portion of the opener blade and adjacent a residue guide as better described below. Advantageously, the widening of the gap between the coulter disc and the opener blade assists with preventing the residue from jamming the coulter disc.

In another aspect, the opener blade includes a leading edge and a residue guide, the residue guide extending upwardly from an upper end of the leading edge, the leading edge and the residue guide together forming an upwards curved edge that is substantially concentric with the coulter disc. As the coulter disc rotates, residue from the ground, which may include soil, plant material and stones or rocks, is carried by the serrated teeth of the coulter disc along the curved edge, travelling from the leading edge of the opener blade to the residue guide, and then as the residue reaches the residue guide, gravity pulls the residue back down to the ground so that it falls away from the coulter disc and opener blade. In this manner, residue buildup is avoided by removing the residue from the space between the coulter disc and the opener blade, which would otherwise become trapped between the coulter disc and the curved edge of the opener blade and residue guide. Furthermore, when a larger object, such as a rock, becomes trapped between the coulter disc and the curved edge, the tension spring compresses as the swing arm moves forward into a tripped position, moving the coulter disc away from the opener blade so as to open up the space between the coulter disc and the opener blade. While the swing arm is in the tripped position, the large object such as a rock is released and falls away from the opener blade. Once the large object falls out of the space between the coulter disc and the opener blade and residue guide, the compressed spring pushes the swing arm and coulter disc back to the default position, so that the coulter disc is again adjacent to opener blade.

In some embodiments, the residue management system further includes a mechanism for adjusting the position of the coulter disc relative to the opener blade and the ground. In one aspect of the present disclosure, a vertical adjustment bar is attached at a lower end to an opener blade support of the opener blade, an upper end of the vertical adjustment bar supporting a stack of shims, the shim stack being sandwiched between the row unit assembly frame and the upper end of the vertical adjustment bar. When it is desired to adjust the position of the coulter disc relative to the opener blade and the ground, when at least one shim is removed from the shim stack, an opener assembly, which includes the opener blade mounted to the opener blade support, a closer wheel assembly, and a metering device, moves upwardly towards the frame of the row unit assembly so as to move the swing arm and the coulter disc downwardly towards a tip of the opener blade, thereby increasing a penetration depth of the coulter disc.

On the other hand, when at least one shim is added to the shim stack, the opener assembly moves downwardly away from row unit assembly frame to position the swing arm and the coulter disc upwardly away from the tip of the opener blade, thereby decreasing the penetration depth of the coulter disc.

The coulter disc may also be adjusted so as to move the coulter disc towards or away from the opener blade, by adjusting the default stop. The default stop may be adjusted for example by retracting the default stop away from the vertical adjustment bar, which moves the default position of the coulter disc closer to the curved edge of the opener blade and the residue guide. On the other hand, extending the default stop towards the vertical adjustment bar moves the default position of the coulter disc farther away from the curved edge of the opener blade and residue guide.

The shims of the shim stack may be held adjacent to the upper end of the vertical adjustment bar by means of a spring-loaded pin inserted through apertures in each of the shims, and so adjustments to remove or add shims to the shim stack may be accomplished by simply rotating one or more shims about the spring-loaded hinge that is inserted through the apertures of the shims.

In another aspect of the present disclosure, a modular opener blade is provided. In some embodiments, the modular opener blade includes a tip, an opener blade body, and a tail. Both the tip and the tail are selectively attachable to the blade body. Advantageously, should the tip or the tail wear faster than the opener blade body, they may be replaced by substituting the worn tip or tail with a new tip or tail by attaching the new tip or tail to the opener blade body. Furthermore, should an operator of the planter/seeder equipment desire a different configuration of opener blade, such as having a three-inch paired row as opposed to a four-inch paired row, the operator may simply exchange the four-inch paired row tail with a three-inch paired row tail, which is installed onto the opener blade body. In some embodiments, the opener blade body includes a tip flange and a tail flange, and the tip and the tail each have corresponding slots for receiving the tip flange and the tail flange of the opener blade body. In some embodiments, a singulator may be releasably attachable to the tail of the opener blade, when it is desired to plant a singulated seed or other granulated agricultural product using the opener blade.

In another aspect, the metering pod may be provided with a product redirection system for selectively adjusting which agricultural products metered from a plurality of metering devices within the metering pod will be deposited through selected outlets in the opener blade. In some embodiments of the present disclosure, the product redirection system for the metering pod includes a metering pod having a housing that encloses at least four metering devices for dispensing four different agricultural products. Each metering device has an outlet attached to a flexible hose, the flexible hose having one end attached to the metering device outlet and a funnel end attached to a slider block. The slider block is mounted to a slider rod, the slider block and the slider rod supported above a divided funnel. The funnel of the metering pod may be divided, for example, into three compartments, each compartment of the three funnel compartments leading to a funnel outlet of the three different funnel outlets of the funnel, wherein each funnel outlet is in fluid communication with a corresponding opener blade outlet of the three outlets on the opener blade through the conduit.

When it is desired to redirect a selected agricultural product into a selected funnel compartment of the funnel, the slider rod is actuated to position the slider block over the selected funnel compartment. In one aspect, an operator may choose to position a slider block over a single funnel compartment, or the slider block may be optionally positioned over the divider between two adjacent funnel compartments, so that an agricultural product from one metering device is fed into each of the two adjacent funnel compartments. In some embodiments, the slider rods and slider blocks may be actuated by electromechanical means, such as using hydraulics or motors to move the slider rods back and forth across the openings of the funnel compartments. In this manner, prescription farming may be utilized to change the placement of agricultural product within the furrow in real time during a seeding operation, as may be called for by a field prescription. For example, it may be advantageous in one section of the field to place fertilizer adjacent to a seed in the vertical position within the furlough, while in other sections of the field it may be advantageous to place fertilizer at a horizontal distance apart from the vertical position of where the seed is placed within the furrow.

In one aspect of the present disclosure, a residue management system for an agricultural row unit assembly comprises a coulter disc rotationally mounted to a spring-tensioned swing arm, the swing arm mounted to a stop plate distal from the coulter disc, wherein a distal end of the swing arm is pivotally mounted to a frame of the row unit assembly, the frame supporting a default stop and a forward stop for limiting a range of motion of the swing arm. The system may also comprise an opener blade having a leading edge and a residue guide, the residue guide extending upwardly from an upper end of the leading edge, the leading edge and the residue guide together forming a curved edge, the curved edge being substantially concentric with the coulter disc. When the row unit assembly is travelling in a forward direction, a tension spring mounted between the frame and the stop plate urges the stop plate against the default stop and the swing arm maintains the coulter disc in a default position at a default distance between an outer diameter of the coulter disc and the curved edge. As the coulter disc rotates, debris from the ground is carried by a plurality of teeth of the coulter disc along the curved edge, from the leading edge of the opener to the residue guide, and then said debris falls away from the residue guide. When a large object having a dimension exceeding the default distance enters a space between the coulter disc and the leading edge of the opener, the tension spring compresses as the stop plate travels downwardly towards the forward stop and the swing arm swings the coulter disc outwardly away from the opener and the residue guide into a tripped position until the large object has cleared from the space between the coulter disc and the curved edge, after which the compressed tension spring urges the stop plate against the default stop so as to return the coulter disc to the default position adjacent the curved edge at the default distance between the outer diameter of the coulter disc and the curved edge.

In some embodiments of the residue management system, the residue guide is integrally formed with the opener blade of the row unit, the residue guide extending from an upper surface of the upper end of the opener blade. In other embodiments, the residue guide is manufactured of a resilient plastic, and when debris comes into contact with the residue guide and thereby deforms the residue guide, the residue guide flexes and then returns to its original position so as to push the debris laterally away from the coulter disc.

DETAILED DESCRIPTION

In one aspect of the present disclosure, a residue management system for a seeder/planter row unit assembly includes a coulter disc mounted to a swing arm, the swing arm tensioned by a tension spring so that large objects will trip the swing arm into a tripped position with the coulter disc moved away from the opener blade, thus allowing large objects, such as rocks, to be released from the space between the coulter disc and the opener blade. The residue management system further includes a residue guide, the residue guide positioned above an upper end of the opener blade. The residue guide extends the curvature of the leading edge of the opener blade, thereby forming an upwards curved edge that guides the residue as it is carried along the opener blade and the residue guide by the serrated teeth of the coulter disc. As the residue from the ground, which may include soil, plant material and/or mulch, reaches the upper portion of the opener blade and continues to be carried along the residue guide by the rotating coulter disc, the residue is pulled downward by gravity, causing the residue to fall away from the coulter disc rather than building up in the space between the coulter disc and opener blade.

In some embodiments, the residue management system may also provide an adjustment mechanism for maintaining the coulter disc in an ideal position relative to the opener blade and the ground as the coulter disc is worn down over time. The adjustment system may include a vertical adjustment bar and a shim stack, and the position of the coulter disc relative to the opener blade and relative to the ground is adjusted by a combination of adding or removing shims from the shim stack and shortening or lengthening the extension of the default stop.

Some embodiments may include at least one mower mounted ahead of corresponding row units, for example and advantageously for use on a reduced-scale seeder/planter incorporating, for example and not intended to be limiting, between two and twelve row units. Each mower may be a mower having a deck housing enclosing at least one horizontally rotating blade, wherein the deck housing and the blade may be remotely lowered into its cutting position. The mower may be remotely actuated so as to mulch crop residue in advance of processing of the mulched residue by the coulter discs.

As may be seen in FIG. 1B the small-scale seeder/planter may for example include hoppers feeding the metering devices for the openers.

Spring Tensioned Swing Arm

Figure 1:
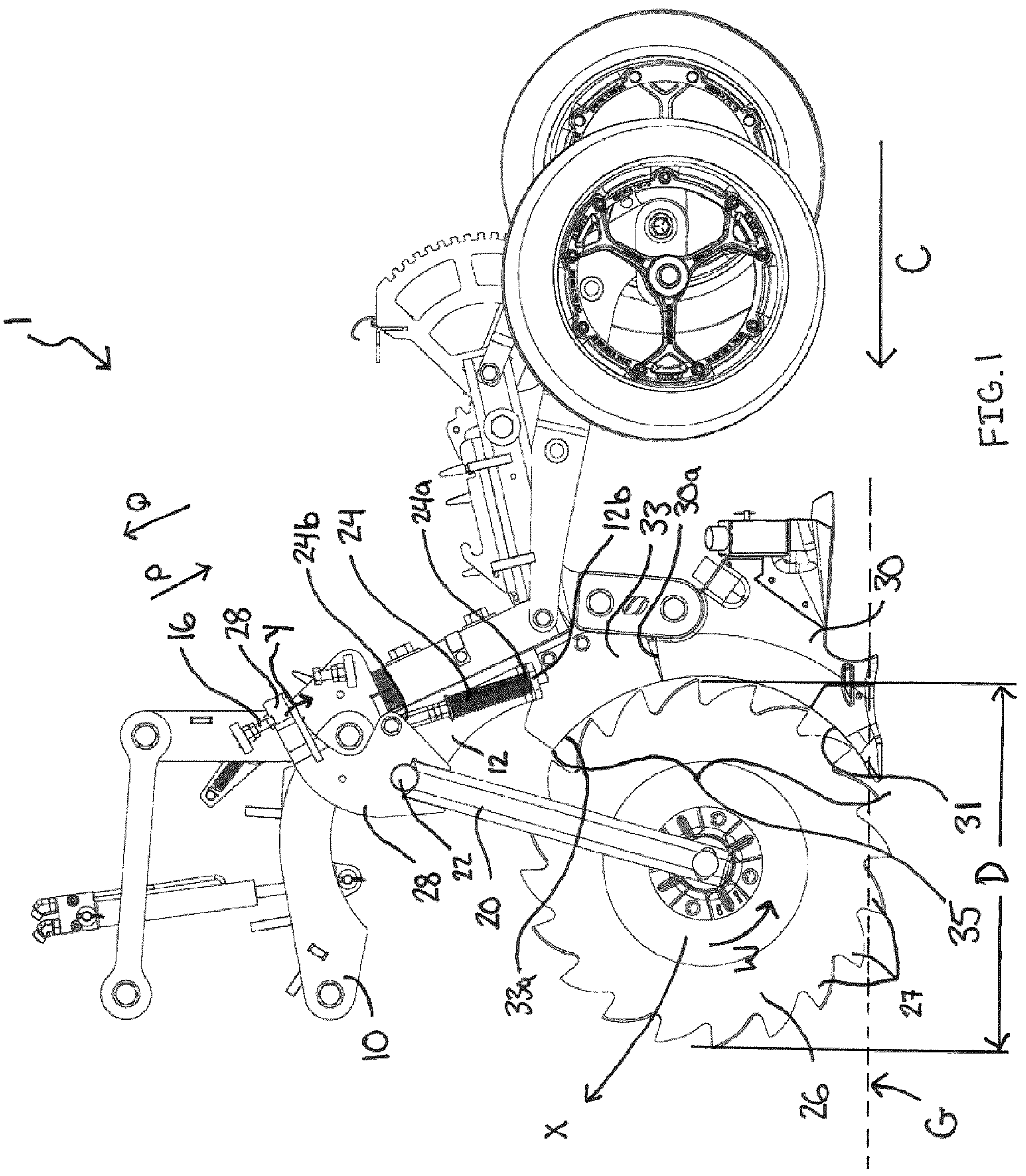
FIG. 1 is a side profile view of an embodiment of the residue management system for a row unit assembly, in accordance with the present disclosure.
Figure 2:
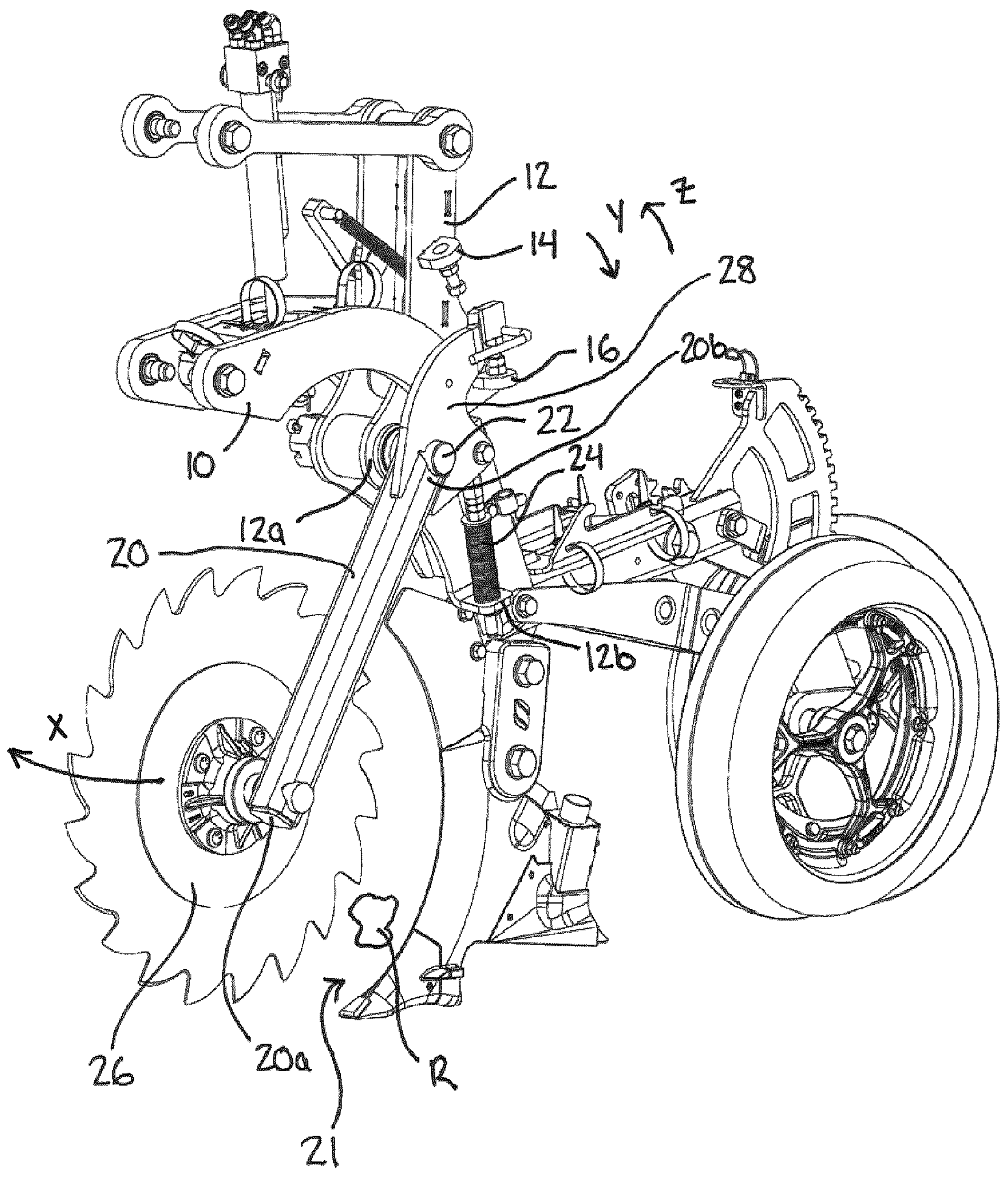
FIG. 2 is a front perspective view of the residue management system of FIG. 1, with the coulter disc in a tripped position.
Figure 3:
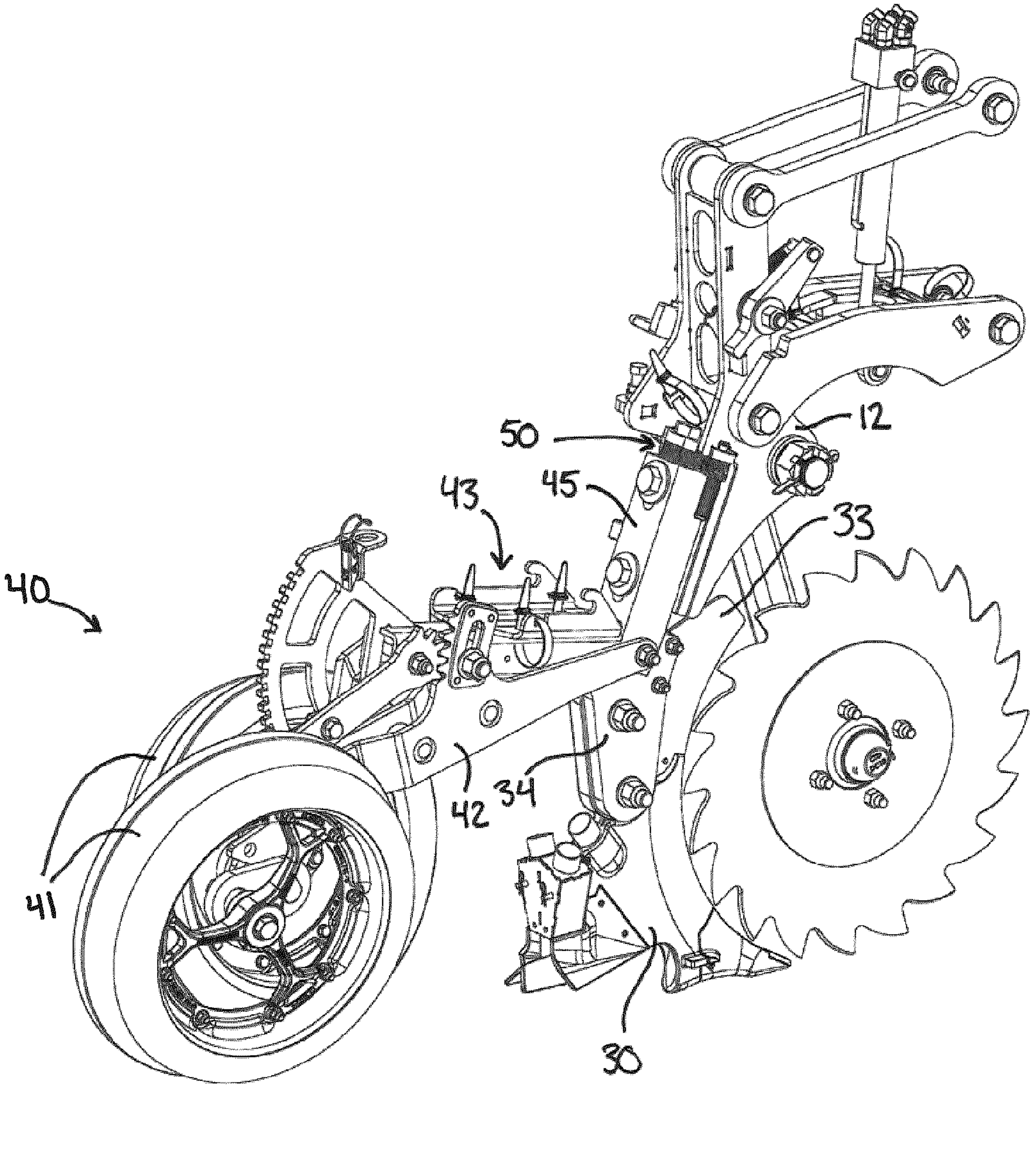
FIG. 3 is a side perspective view of the residue management system of FIG. 1, with the coulter disc in a default position.
Figure 5:
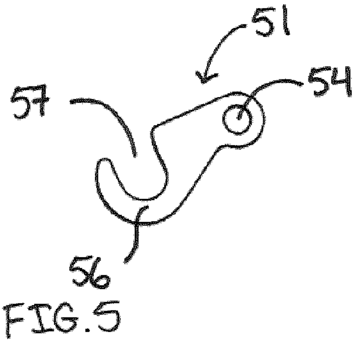
FIG. 5 is a top plan view of a shim.

With reference to FIGS. 1-6 an embodiment of the row unit assembly 1 is illustrated, with the metering device and the flexible hose removed for clarity. The row unit assembly 1 is mounted to a seeder/planter agricultural implement (not shown), and includes a row unit assembly frame having a horizontal plate 10 and a vertical plate 12. On the vertical plate 12 there is mounted a default stop 14 and a forward stop 16. The swing arm 20 is pivotally mounted to the middle portion 12*a* of the frame vertical plate 12 at a pivot axle 22. A tension spring 24 is mounted to a lower end 12 the of the frame vertical plate 12. The coulter disc 26 is mounted to a distal end 20*a* of the swing arm 20, and at a proximate end 20*b* of the coulter arm, proximate to the pivot axle 22, there is mounted a stop plate 28 of the swing arm 20. When the coulter disc 26 is in a default position, as shown in FIGS. 1 and 3, the stop plate 28 is resting against the default stop 14 and held in that position by the tension spring 24, which tension spring is mounted at a first end 24*a* to the lower end 12*b* of the frame vertical plate 12, and this tension spring 24 is mounted at a second end 24*b* to the swing arm stop plate 28. As such, the tension spring 24 urges the stop plate 28 against the default stop 16 when the swing arm 20 is in the default position, as shown for example in FIG. 1.

Figure 1A:
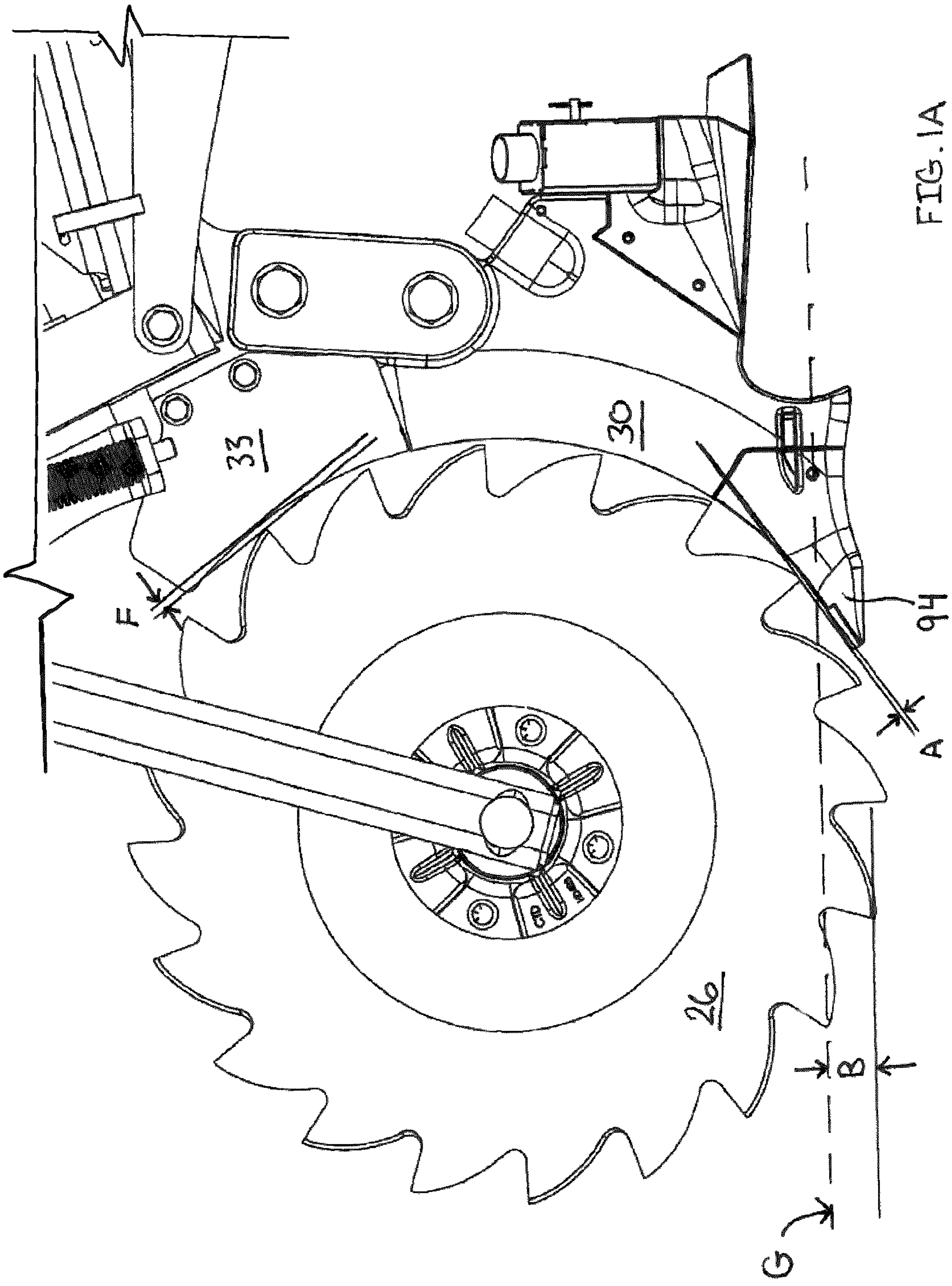
FIG. 1A is a close up of a portion of the residue management system shown in FIG. 1.

As shown in FIG. 1A, in a preferred embodiment, the default position of the coulter disc 26 relative to the opener blade 30 is at a distance A of substantially ¼ of an inch between the leading edge 31 of the opener blade and the outer diameter D of the coulter disc 26, as measured at the tip 94 of the opener blade 30. The gap or space between the coulter blade 26 and the opener blade 30, preferably, gradually increases along the leading edge 31 of the opener blade and the residue guide, such that the distance F of the space increases to approximately ⅜ of an inch at the residue guide 33. Additionally, the penetration distance B of the coulter disc 26 into the ground G is preferably ⅜ of an inch. As will be explained further below, in some embodiments the residue management system preferably includes a mechanism for changing the position of the coulter disc default position shown in FIG. 1, relative to both the opener blade 30 and the ground G.

Figure 4:
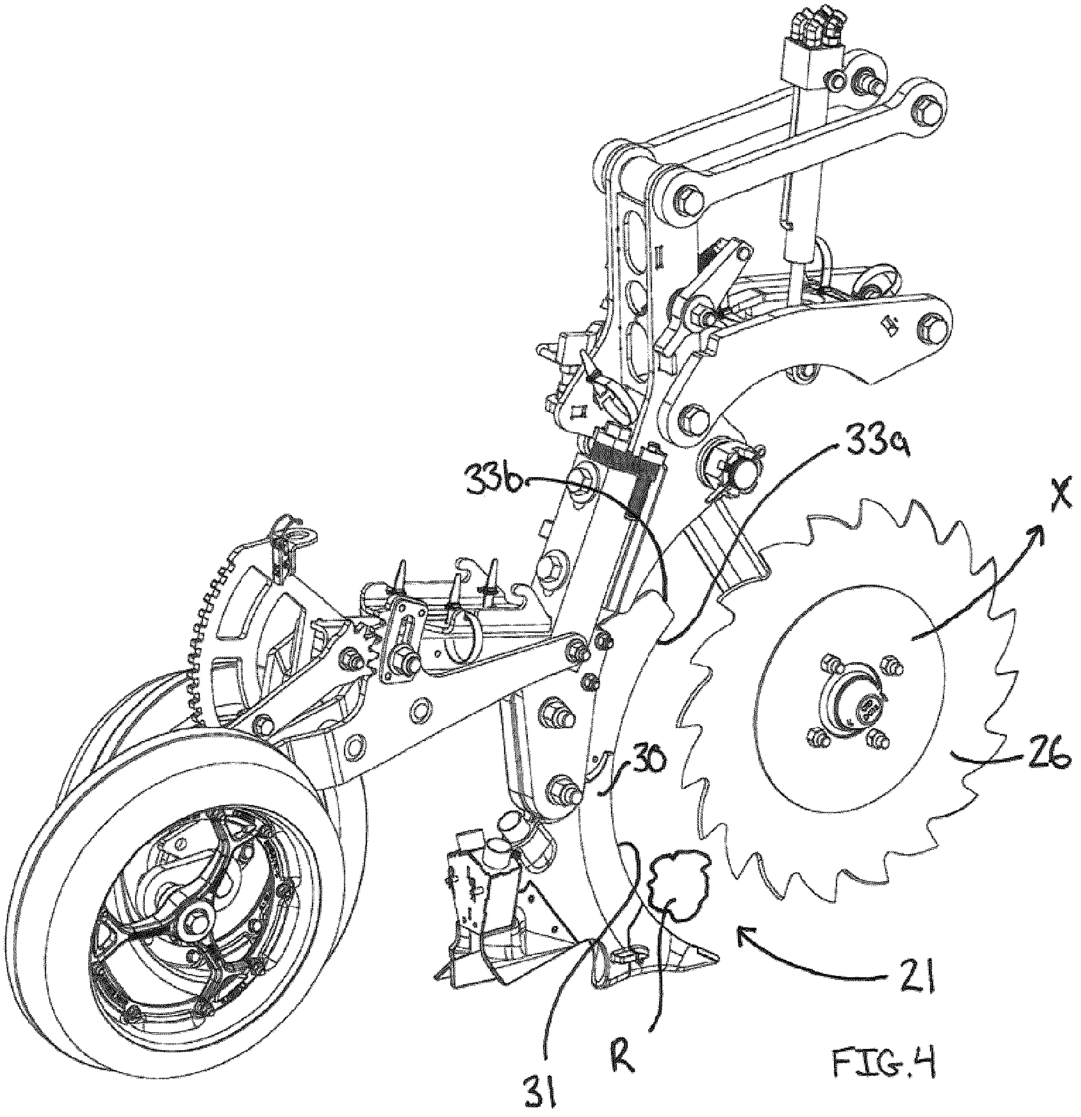
FIG. 4 is a side perspective view of the residue management system of FIG. 1, with the coulter disc in a tripped position.
Figure 6:
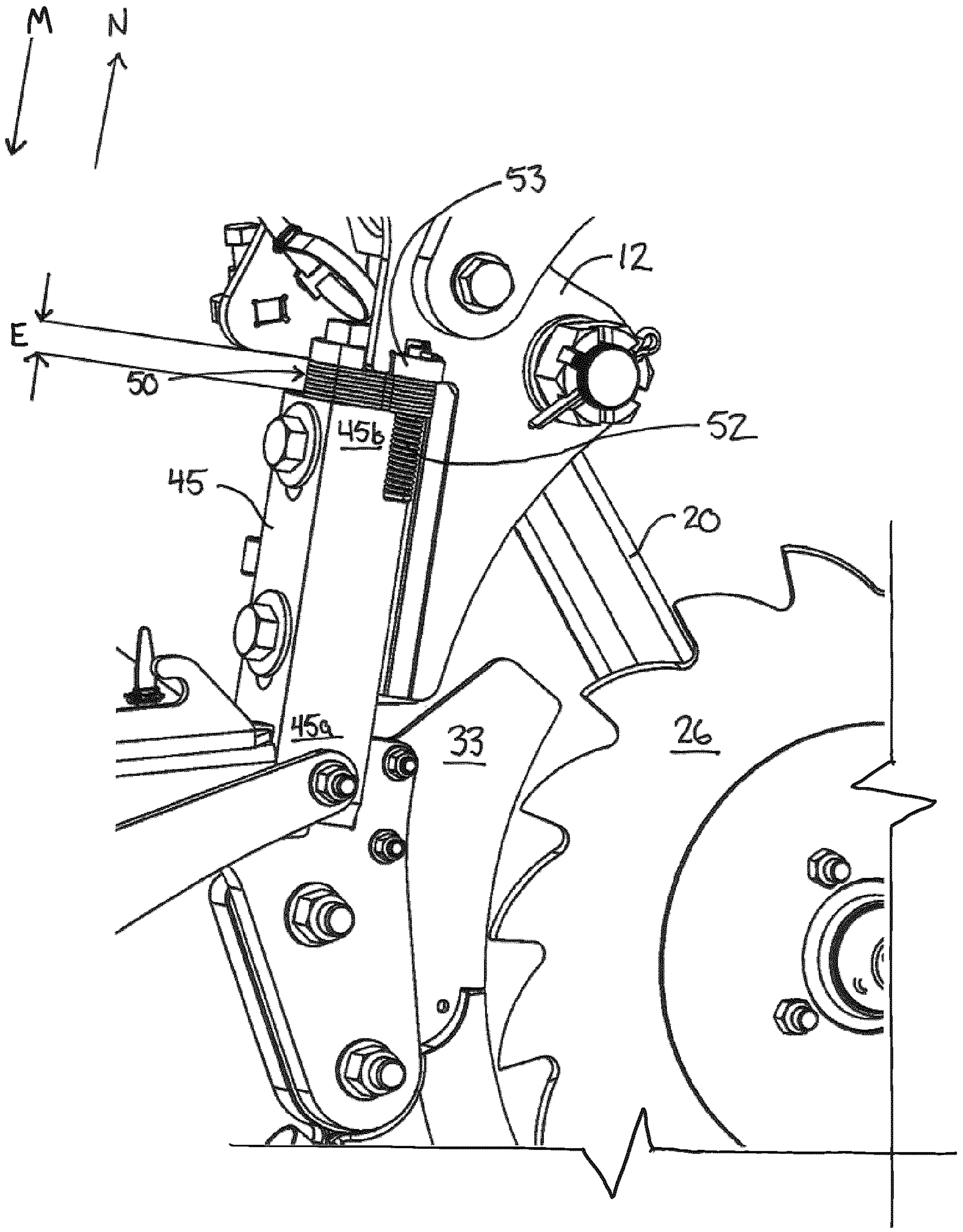
FIG. 6 is a close-up view of a shim stack of the residue management system shown in FIG. 3.

During operation, when a larger object, such as a rock R, enters the space 21 between the coulter disc 26 and the leading edge 31 of the opener blade 30, advantageously the swing arm 20 swings outwardly away from the opener blade 30 in rotational direction X, compressing tension spring 24. The swing arm 20 travels outwardly away from the opener blade 30, in direction X, while the stop plate 28, which extends beyond the pivot axle 22, moves downwardly in direction Y until it comes to rest against forward stop 16, as best viewed for example in FIG. 2. In the tripped position, as shown in FIGS. 2 and 4, the space 21 between the coulter disc 26 and the leading edge 31 of the opener blade 30 opens up, allowing the large objects such as a rock R, to fall out of the space 21. Once the rock R or other object falls out of the space 21, the compressed spring 24 urges the stop plate 28 in the opposite direction Z, thereby bringing the stop plate 28 to rest against the default stop 14, thereby returning the coulter disc 26 to its default position as shown in FIGS. 1 and 3.

Residue Guide

A further aspect of the residue management system includes the residue guide 33. Residue guide 33 may be attached to or adjacent to an upper portion 30*a* of the opener blade 30. In some embodiments, the residue guide 33 may be a piece that is separate from the opener blade 30; in other embodiments, residue guide 33 may be integrally formed with the opener blade 30, and therefore an extension of the opener blade 30. Preferably, the residue guide 33 is manufactured of a high molecular weight polymer, or any other suitable material for making a strong and resilient residue guide which will yield or flex when it is hit by residue or objects, including rocks. Advantageously, when the residue guide 33 has some flexibility to it, it may better deflect residue in a lateral direction outwardly and away from row unit assembly 1.

A leading edge 33*a* of the residue guide 33 may have substantially the same curvature radius as the leading edge 31 of the opener blade 30, thereby effectively extending the upwards curved edge 35 of the leading edge of 31 of the opener blade and the leading edge 33*a* of the residue guide. As best viewed in FIG. 1, the curved edge 35 of the combined leading edge 31 of the opener blade and the leading edge 33*a* of the residue guide is approximately concentric to the outer diameter D of the coulter disc 26.

In operation, as the row unit assembly translates along a field in direction C, coulter disc 26 rotates in direction W, breaking up the ground ahead of the opener blade 30. As coulter disc 26 rotates in direction W, the plurality of serrated teeth 27 of the coulter disc 26 may carry residue from the field, such as soil and plant matter, along the leading edge of the opener blade 31, and then as the coulter disc 26 travels beyond opener blade 30 to the residue guide 33, the residue from the ground G is held in the space 21 between the coulter disc 26 and the residue guide 33. As the residue trapped between the coulter disc 26 and the residue guide 33 reaches the upper end 33*b* of the residue guide, the force of gravity pulls the residue back towards the ground, causing the residue to fall away from the coulter disc 26 and the opener blade 30. To the extent that hard debris, such as a rock R, strikes against the residue guide 33, advantageously a resilient residue guide 33 may also deflect the residue outwardly and away from the residue guide 33 in a lateral direction.

Coulter Disc Adjustment

In a further aspect of the present disclosure, in some embodiments the residue management system may also include an adjustment mechanism for adjusting the position of the coulter disc 26 relative to the opener blade 30 and the ground G. As the coulter disc is used over time, the serrated teeth 27 will gradually wear down, thereby reducing the outer diameter D of the coulter disc 26. As mentioned previously, a preferred distance A between the disc 26 and the opener blade leading edge 31 is substantially one quarter of an inch as measured at the tip of the opener blade, with the distance of the space between the coulter disc and the curved edge of the opener blade and the residue guide gradually increasing to substantially ⅜ of an inch towards the upper end of the residue guide, and the coulter disc 26 preferably penetrates into the ground at a vertical distance B of substantially ⅜ of an inch. Because the coulter disc 26 wears over time with use, thereby reducing the outer diameter D of the coulter disc 26, it becomes necessary from time to time to adjust the positioning of the coulter disc 26 relative to the ground G and the leading edge 31 of the opener blade so as to maintain the preferred default position and spacing of the coulter disc 26.

In some embodiments of the present disclosure, an adjustment mechanism comprises an adjustable support, such as a vertical adjustment bar. An opener assembly 40, comprising packer wheels 41, packer wheel frame 42, metering device 91 mounted to the metering device mount 43, opener blade 30 and the residue guide 33 which are mounted to an opener blade support 34, are all supported on a lower end 45*a* of the vertical adjustment bar 45, as best viewed for example in FIG. 6. At the upper end 45*b* of the vertical adjustment bar 45, there is supported a shim stack 50. The shim stack 50, comprising a plurality of shims 51, is sandwiched between the vertical plate 12 of the row unit assembly frame and the upper end 45*b* of the vertical adjustment bar 45. Each shim 51 of the shim stack 50 includes an aperture 54 at one end of the shim 51, and a shim body 56. The shim body 56 may include a notch 57 for receiving a support post or bolt (not shown), the support post or bolt extending downwardly from the vertical plate of the row unit assembly frame and slidably journaled through the upper end 45*b* of the vertical adjustment bar 45. The shim stack 50 is supported adjacent the upper end 45 of the vertical adjustment bar 45 by a spring-loaded pin 52, the spring-loaded pin 52 mounted through a pin support 53 on the vertical frame plate 12. Spring-loaded pin 52 is journaled through the apertures 54 of the plurality of shims 51.

When it is desired to adjust the position of the coulter disc 26 relative to the opener blade 30 and the ground G, shims 51 may be added to or removed from the shim stack 50 so as to increase or decrease the distance the between the vertical frame plate 12 and the upper end 45*b* of the vertical adjustment bar 45, thereby moving the position of the opener assembly 40 relative to the row unit assembly frame 12, on which the swing arm 20 and the coulter disc 26 is pivotally mounted. For example, in some embodiments the shims may be easily added to or removed from the shim stack 50 by rotating each shim 51 about the spring-loaded pin 53 and the aperture 54 that runs through each shim 51. When shims 51 are added to the shim stack 50 sandwiched between the vertical frame plate 12 and the vertical adjustment bar 45, the distance E increases, thereby moving the vertical adjustment bar 45 downwardly in direction M away from the row unit assembly frame 12. Because the opener assembly 40 is mounted to the lower end 45*a* of the vertical adjustment bar 45, adding shims to the shim stack 50 moves the leading edge 31 of the opener blade downwardly in direction M and away from the coulter blade 26 and the row unit assembly frame. On the other hand, removing shims 51 from shim stack 50 decreases the distance E between the vertical plate 12 and the upper end 45 the of the vertical adjustment bar, which moves the opener assembly 40 in the opposite direction N towards the row unit assembly frame 12, thereby moving the row unit assembly including the opener blade 30 upwardly and closer to the coulter blade 26.

Also, the default stop 16 may be adjusted, for example by means of a screw mechanism. Thus, the default stop 16 may be extended in direction P, thereby moving the swing arm 20 and coulter disc 26 in direction X away from the opener blade 30; similarly, retracting the default stop 16 in direction Q moves the swing arm 20 and the coulter disc 26 in a direction opposite of direction X, thereby bringing the coulter disc 26 closer to the leading edge 31 of the opener blade 30 when the coulter disc 26 is in the default position.

Modular Opener Blade

As best viewed in FIGS. 10 to 17, a modular opener blade assembly 30 comprises a blade 82, the blade 82 having a front portion 82*a* and a rear portion 82*b*. The front portion 82*a* of the blade 82 may comprise a tip mounting flange 84 and the rear portion 82*b* may comprise a tail mounting flange 86. The tip mounting flange 84 mates with a corresponding slot 94*a* on the tip 94, and the tail mounting flange 86 mates with a corresponding slot 96*a* on tail 96. Advantageously, because the tip 94 and/or the tail 96 may typically wear faster than the blade 82 during use of the opener blade 30, providing an opener blade assembly 30 with modular components, such as the separate tip 94 and tail 96, such components may be replaced as they wear out, rather than having to replace the entire opener blade assembly 30 when only a portion of the opener blade assembly 30 has worn.

Figure 12:
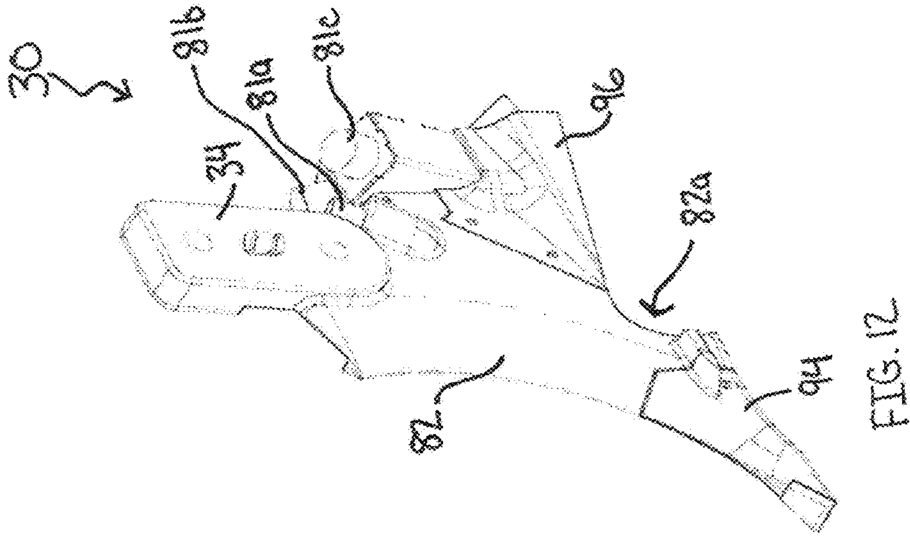
FIG. 12 is a front perspective view of the opener blade shown in FIG. 10.
Figure 16:
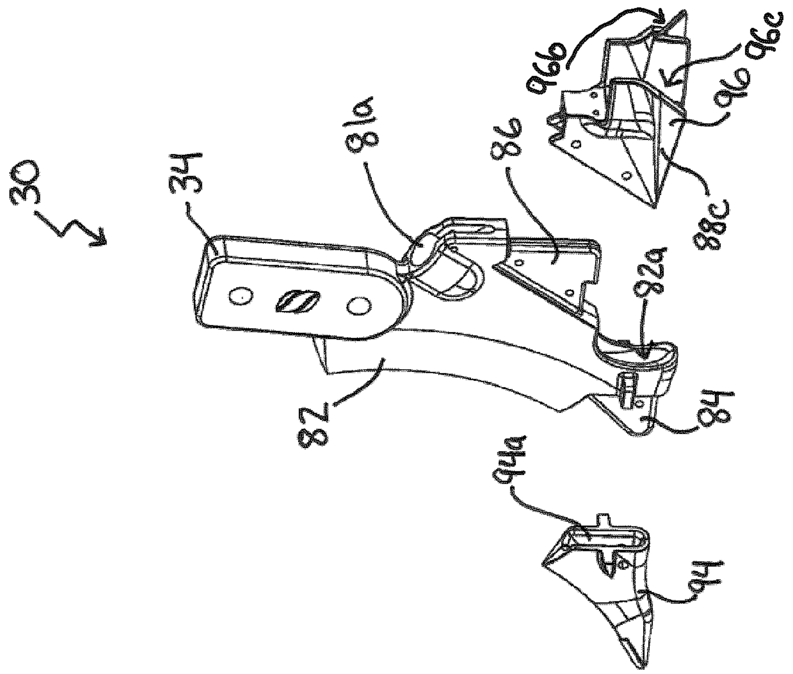
FIG. 16 is an exploded rear perspective view of the opener blade shown in FIG. 10.
Figure 15:
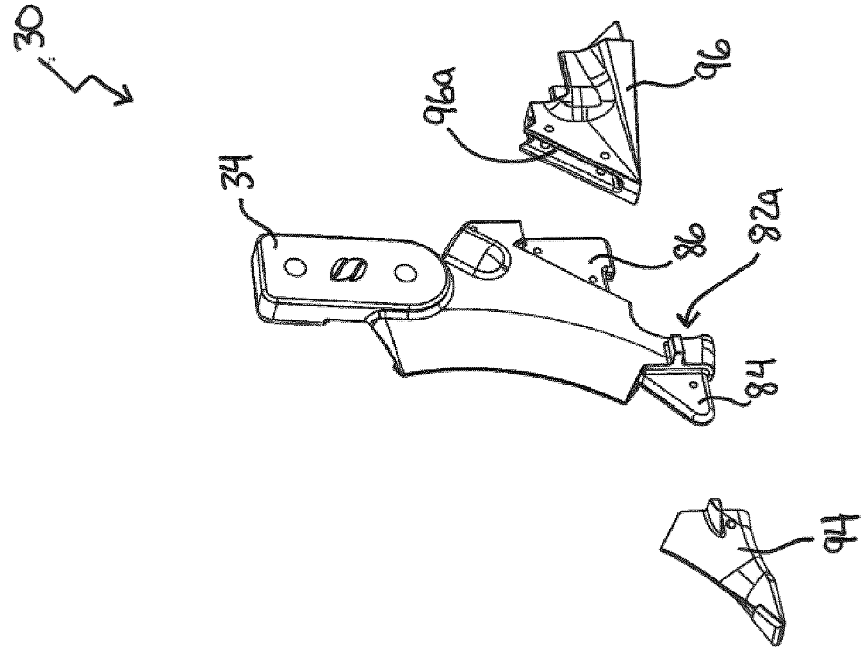
FIG. 15 is an exploded front perspective view of the opener blade shown in FIG. 10.

A further advantage of the modular design of the modular opener blade assembly 30 is that an operator may readily reconfigure the placement of product within a furrow during seeding operations. For example, as can best be seen in FIG. 12 and without intending to be limiting, the opener blade assembly 30 may include three product inlets, including a deep centre inlet 81*a*, and left and right ledge inlets 81*b*, 81*c*. In other embodiments more than three product inlets are provided, for example, and without intending to be limiting, four product inlets, for distributing up to four different agricultural products into the ground via the opener. The opener blade assembly 30 shown in FIGS. 10 through 16 opens a furrow in the ground having a deep central vertical position 100, approximately 2.5 inches beneath the surface of ground G. The opener 30 will additionally create a left ledge position 102 and a right ledge position 104, with the left and right ledge positions 102, 104 horizontally spaced apart from each other by four inches. The shallow product ledges 102, 104 are created by left and right wings 88*b*, 88*c* of the tail 96, with the tail outlets 96*b*, 96*c* positioned at the rear portion of the left and right wings 88*b*, 88*c* respectively. As may be best viewed in FIG. 14, inlet 81*c* corresponds to outlet 96*c* and inlet 81*b* corresponds to outlet 96*b*. Whereas, the deep centre inlet 81*a* corresponds to the deep centre outlet 82*a* of the blade 82, as best seen in FIGS. 12 and 16. The deep centre outlet 82*a* is positioned at a lower elevation relative to the wings 88*b*, 88*c* and the corresponding wing outlets 96*b*, 96*c*, thereby depositing agricultural product from the deep centre outlet 82*a* at a deeper vertical position 100 within the furrow, for example a depth of 2.5 inches beneath the surface, as compared to the left and right ledge positions 102, 104, in which positions product is deposited from the left and right wing outlets 96*b*, 96*c*.

Figure 17:
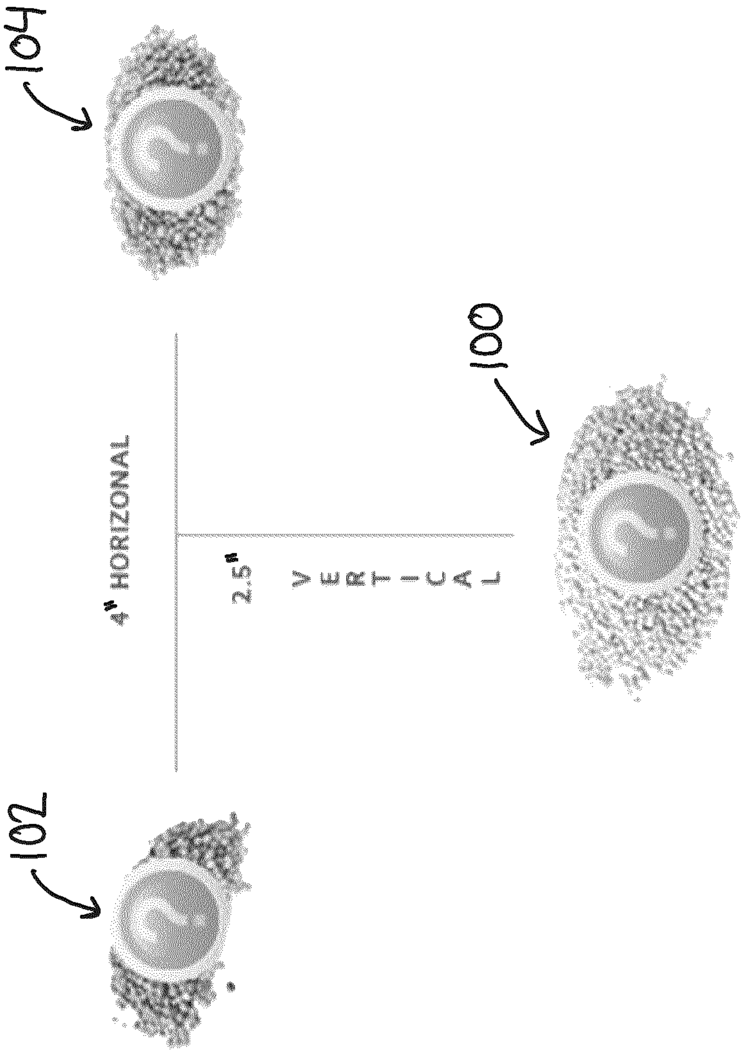
FIG. 17 is a schematic diagram showing the placement of agricultural product deposited through the opener blade shown in FIG. 10.

As mentioned, the configuration of furrow placement, such as shown in FIG. 17, may be changed by changing the tail 96 that is attached to the blade 82. For example, without intending to be limiting, a tail 96 having the left and right wings 88*b*, 88*c* positioned more closely together may result in a three-inch paired row as opposed to a four-inch paired row, wherein the left and right ledge positions 102, 104 are spaced apart from one another in a paired row configuration at a horizontal distance of three inches as compared to a horizontal distance of four inches. Such furrow placement reconfiguration provided herein is an illustrative example, not intended to be limiting.

Figure 19:
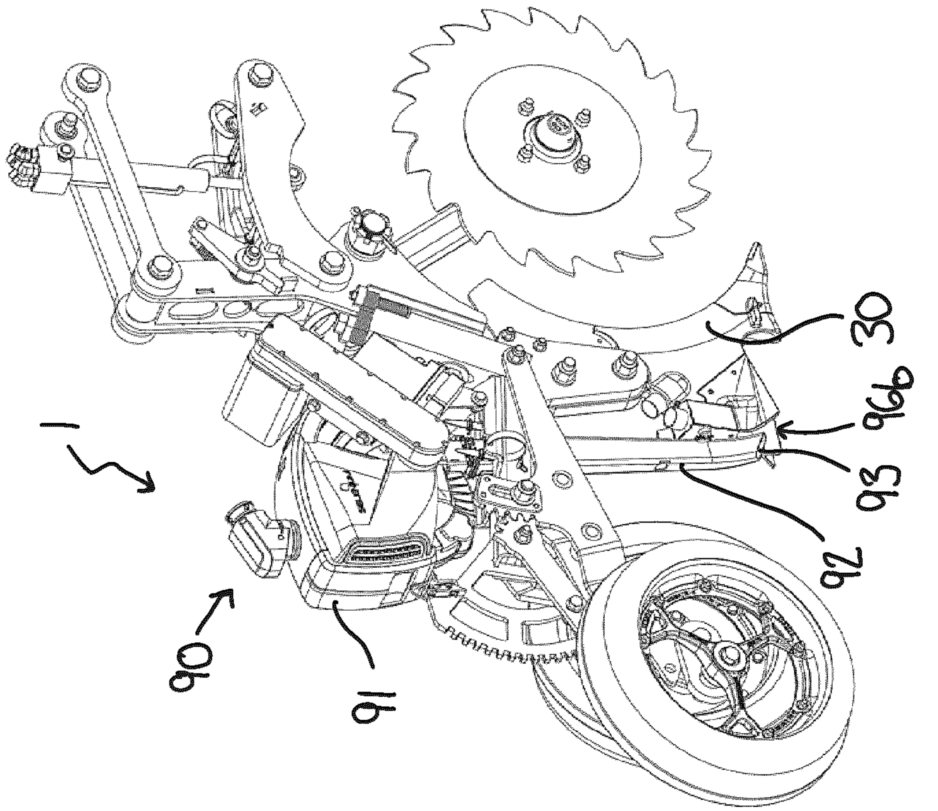
FIG. 19 is a rear perspective view of the embodiment of the residue management system for a row unit assembly shown in FIG. 18.
Figure 18:
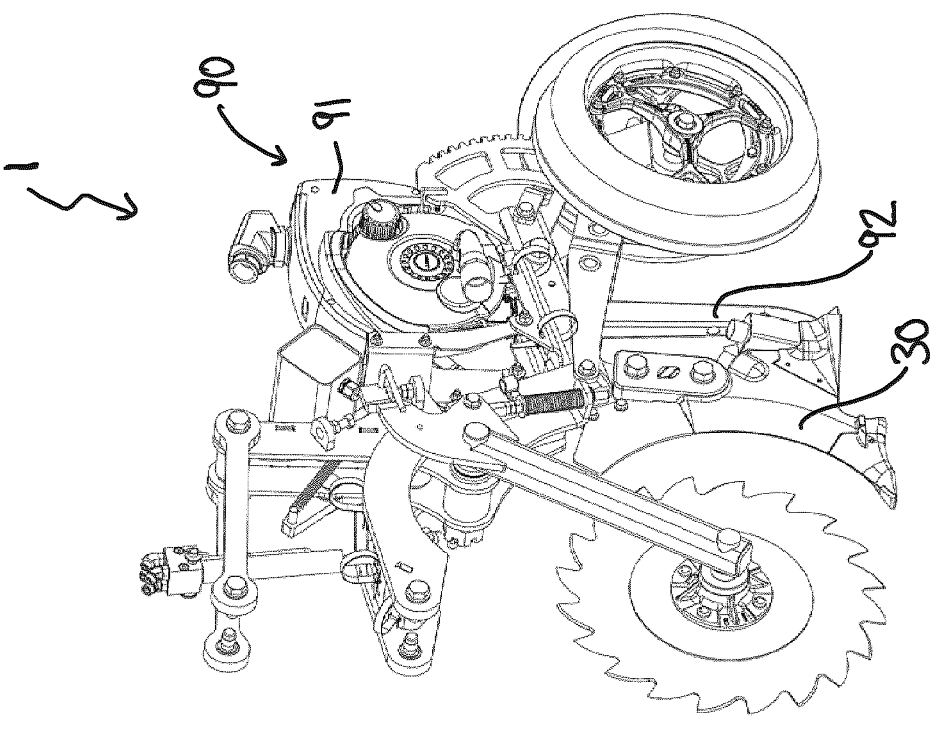
FIG. 18 is a front perspective view of an embodiment of the residue management system for a row unit assembly, including a singulation assembly.

As shown in FIGS. 18 and 19, a further reconfiguration may include, for example, mounting a singulation assembly 90, the singulation assembly 90 including a singulation metering device 91, the singulation metering device 91 depositing seeds into a seed tube 92, the seed tube 92 having a seed tube outlet 93 arranged above either the left or right shelf outlets 96*b*, 96*c*. The seed tube 92 may be supported, for example, on a rear face 98 of the tail 96, and rotated so as to deposit a singulation product onto either the left or right ledge positions 102, 104 as seen in FIG. 17. Alternatively, the singulator may be rotated so as to direct the depositing of the singulation product into the central vertical position 100 within the furrow.

Product Redirection System

Figure 7:
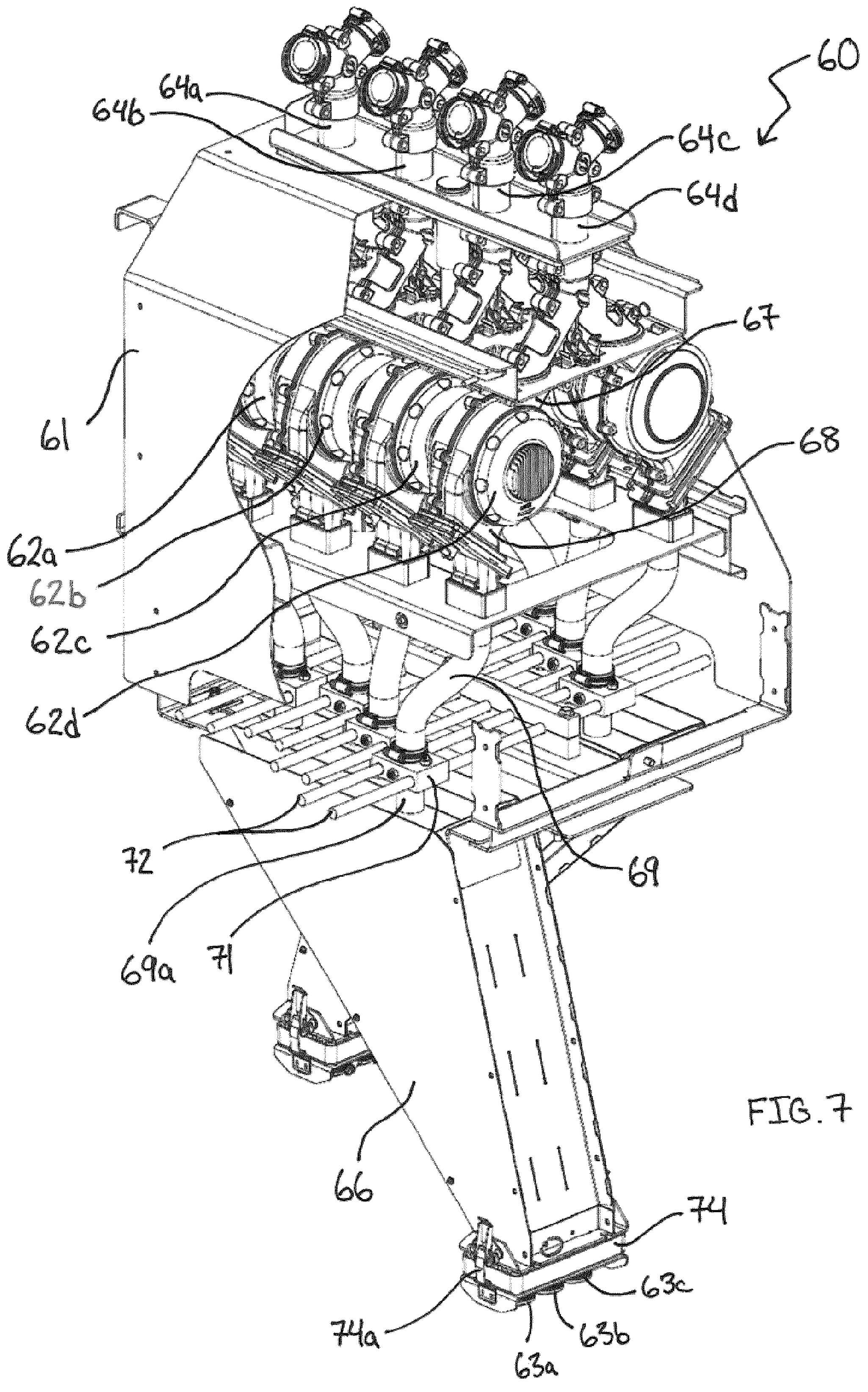
FIG. 7 is a cutaway perspective view of a metering pod incorporating an embodiment of the product redirection system in accordance with the present disclosure.
Figure 9:
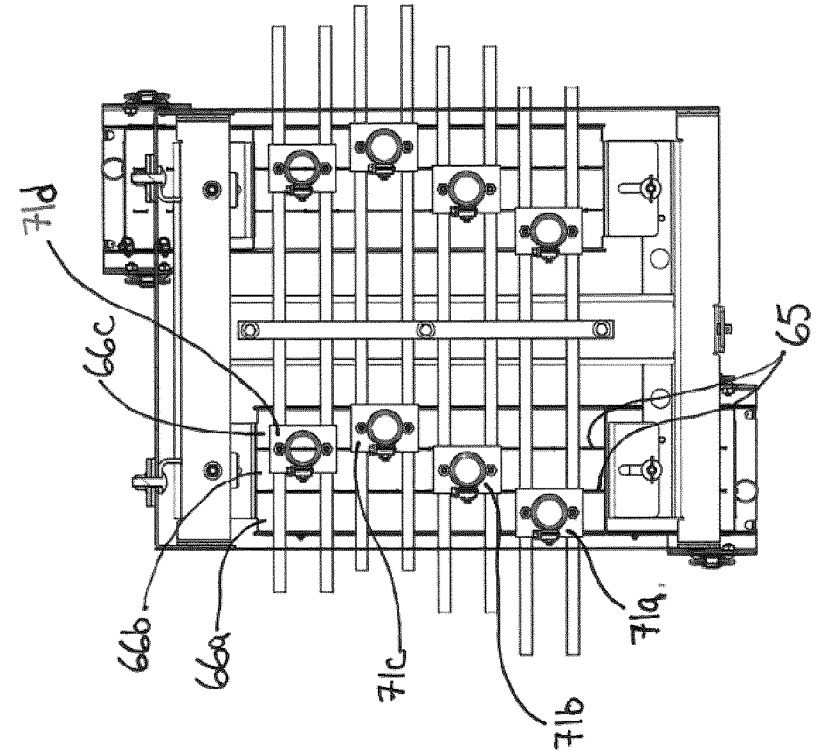
FIG. 9 is a cross section view of the metering pod taken along line A-A in FIG. 8.
Figure 8:
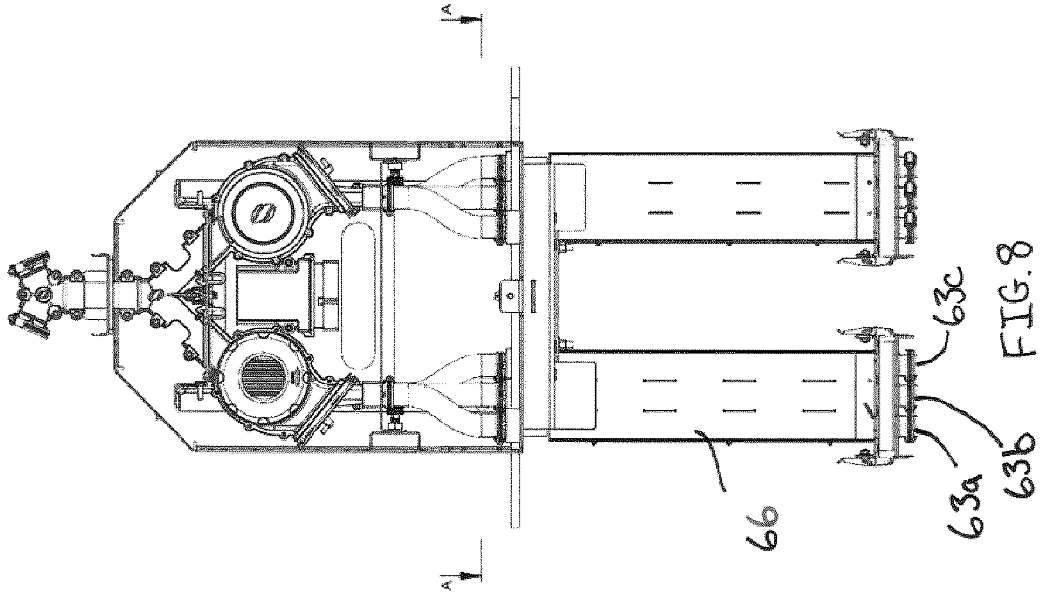
FIG. 8 is a front profile view of the metering pod shown in FIG. 7.
Figure 10:
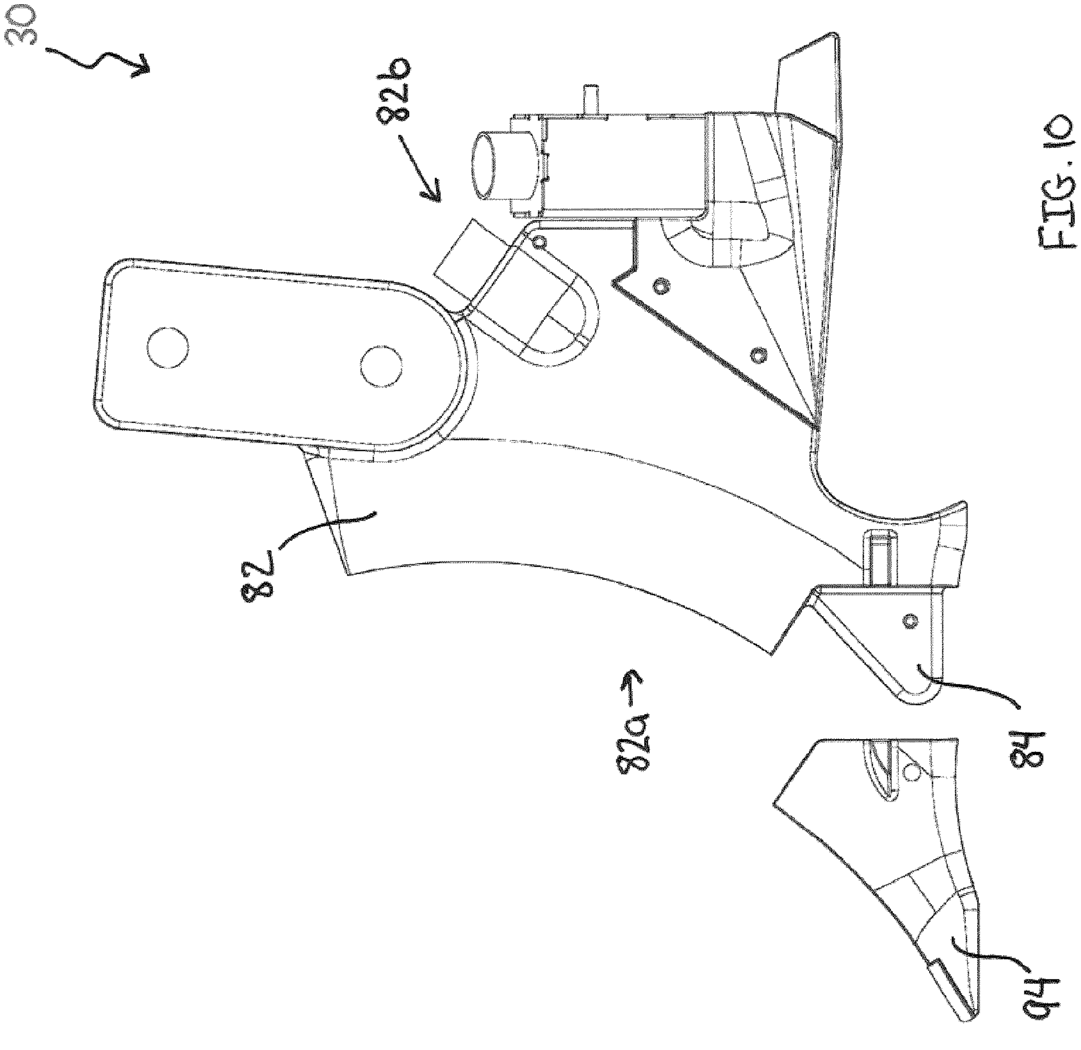
FIG. 10 is a side profile, partially exploded view of the modular opener blade in accordance with the present disclosure.
Figure 11:
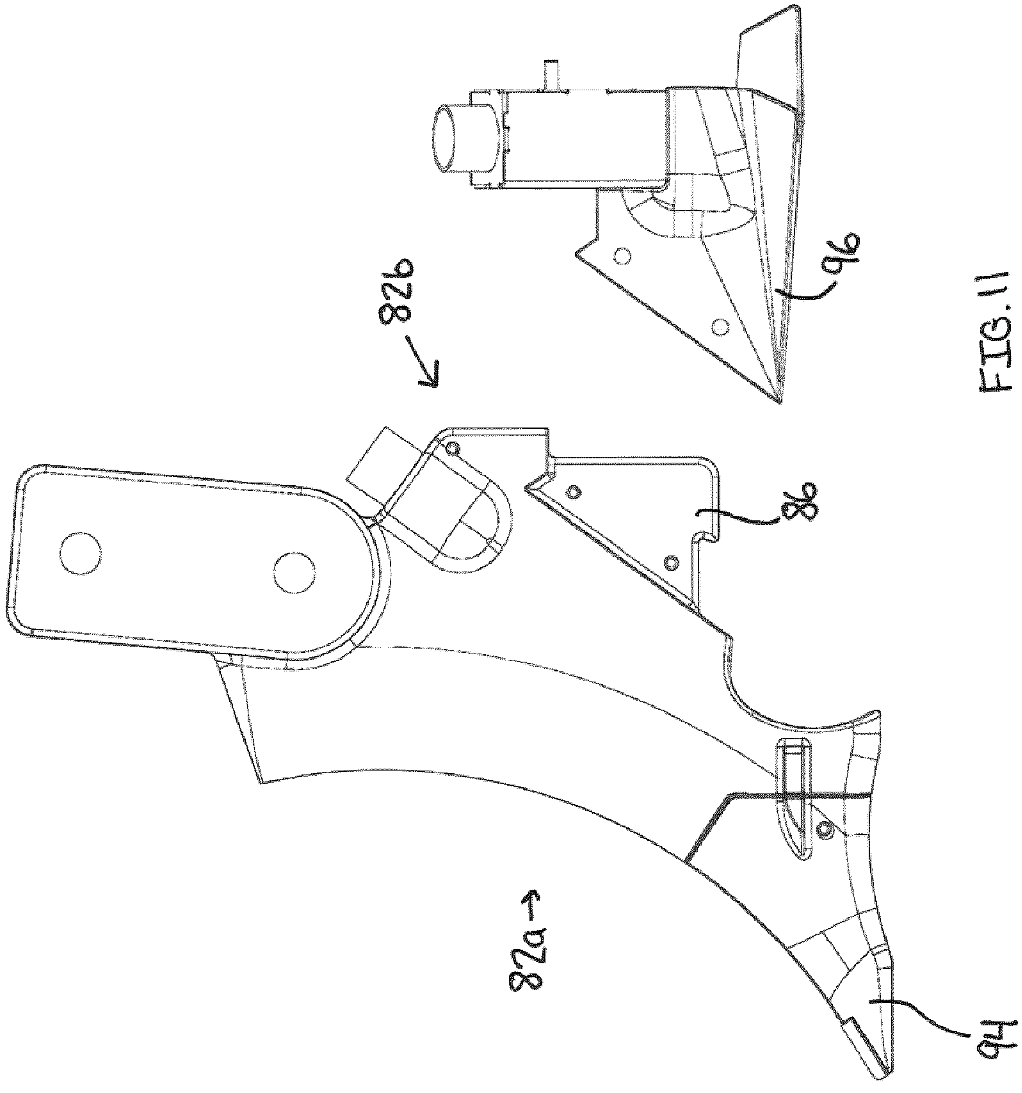
FIG. 11 is side profile, partially exploded view of the modular opener blade shown in FIG. 10.
Figure 14:
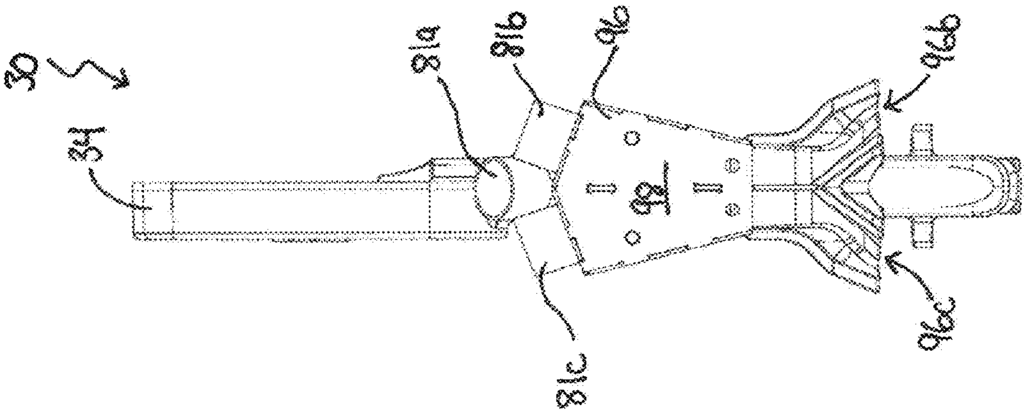
FIG. 14 is a rear profile view of the opener blade shown in FIG. 10.
Figure 13:
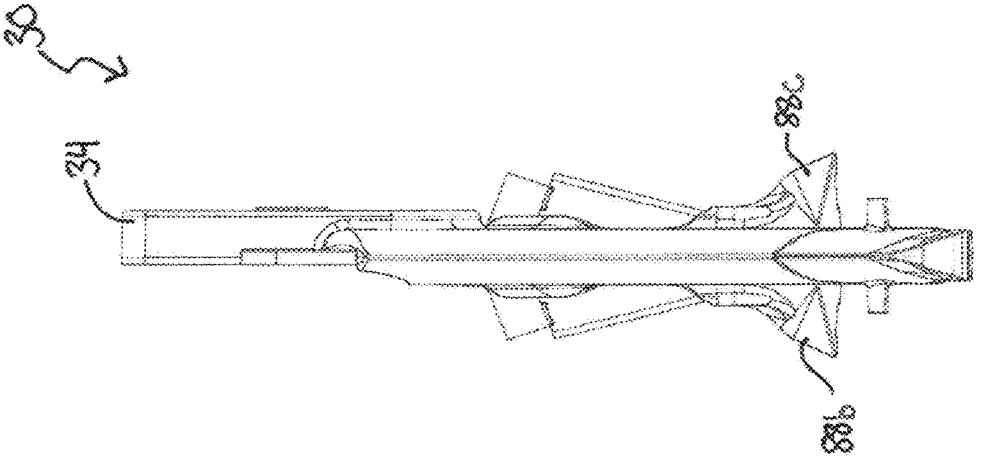
FIG. 13 is a front profile view of the opener blade shown in FIG. 10.

As shown in FIGS. 7, 8 and 9, a metering pod 60 comprises a pod housing 61 containing at least four metering devices 62*a*, 62*b*, 62*c* and 62*d*. The four metering devices 62*a* through 62*d* are supplied by pod inlets 64*a*, 64*b*, 64*c* and 64*d*. As shown in FIG. 7, a pod 60 may include two sets of metering devices 62*a* through 62*d* (eight metering devices in total), for supplying agricultural product to two separate opener blades 30 through two separate product funnels 66; however it will be appreciated by person skilled in the art that a pod 60 may include only four metering devices 62*a* to 62*d*, for feeding only one product funnel 66 for one opener blade 30.

As best viewed in FIG. 7, each metering device 62 includes a metering device inlet 67 and a metering device outlet 68. The metering device outlet 68 is in fluid communication with the funnel 66 through a flexible hose 69. The flexible hose 69 is attached to a slider block 71 and one or more slider rods 72. An outlet 69*a* of the flexible hose 69 projects below the bottom surface of the slider block 71. As best viewed in FIG. 9, the funnel 66 may be divided into at least three separate compartments 66*a*, 66*b*, 66*c*. The slider blocks 71 for each of the four metering devices 62*a* through 62*d* may be selectively positioned over any of the three compartments 66*a* to 66*c*. For example, as shown in FIG. 9, the slider block 71*a* corresponding to metering device 62*a* is positioned over the first funnel compartment 66*a*. The slider block 71*b* is positioned over the second funnel compartment 66*b*, and the slider block 71*c*, corresponding to the metering device 62*c*, is positioned over the third funnel compartment 66*c*. As can be seen in FIG. 9, it is also possible to position a slider block so that it is positioned over one of the dividing walls 65 of the funnel 66, which splits the funnel 66 into three different compartments. For example, slider block 71*d*, corresponding to the fourth metering device 62*d*, may be positioned over the second and third funnel compartments 66*b*, 66*c*, such that the agricultural product dispensed from metering device 62*d* will be dispensed into both the second and third funnel compartments 66*b*, 66*c*.

As will be appreciated, the three funnel compartments 66*a*, 66*b*, 66*c* lead to three separate funnel outlets 63*a*, 63*b*, 63*c*. The funnel outlets 63*a* through 63*c* are each in fluid communication with particular outlets of the opener blade through a corresponding conduit, leading from the funnel outlet to an inlet of the opener blade. Advantageously, the product redirection system enables directing agricultural product dispensed from the metering devices 62*a* to 62*d* to particular positions within the furrow as determined by the configuration of the opener blade outlets. For example, without intending to be limiting, funnel outlets 63*a* and 63*b* may deposit agricultural products on the right and left seed ledges created by the opener blade in a four inch paired row opener configuration. Whereas, the third funnel outlet 63*c* may be configured to meter agricultural product to the centre deep position 100 of the furrow.

Advantageously, by providing the slider blocks 71 and slider rods 72, an operator of the seeding equipment may selectively redirect agricultural products from each of the different metering pods 62*a* through 62*d* to particular positions within the furrow.

In some embodiments, the slider blocks 71 and slider rods 72 may be automated, so as to enable for reconfiguration of the products being directed into the opener blade on-the-fly while conducting a seeding operation. For example, such automated product redirection may be advantageously used to configure product furrow placements during the seeding operation which may change in accordance with a field prescription. The slider blocks 71 and slider rods 72 may be actuated by electromechanical means, for example by using motors or hydraulics to slide the slider block 71 so as to selectively position the slider block 71 over a particular funnel compartment 66*a*, 66*b* or 66*c*.

In some embodiments, the funnel outlets 63*a* through 63*c* may be mounted to a funnel outlet block 74, the outlet block 74 mounted to the funnel 66 by means of a clamp 74*a*. In some embodiments, the funnel outlet 63*a* through 63*c* may include optical or proximity sensors embedded within the outlets 63*a* through 63*c*, for monitoring and detecting when a blockage has occurred in any one of the funnel outlets 63*a* to 63*c*. Advantageously, the blockage sensors may provide a signal to the control system of the seeding equipment when a blockage is detected, informing the seeding equipment operator of the location of the blockage. Conveniently, such blockages at the outlet of the funnel 66 may be easily cleared by releasing the clamp 74*a*, removing the outlet block 74*b*, and clearing the blockage before continuing operations.

Mower

As shown in FIGS. 20 to 22B, at least one mower 120 may be mounted over the ground in front of an array of row units 1'. In the example illustrated, which is not intended to be limiting, mower 120 may in one embodiment be mounted in front of a reduced size or reduced scale seeder/planter 200 so that, when engaged with crop residue S and actuated to rotate the mower cutting assembly 135 at its rotational cutting velocity, the mower mulches the crop residue S, which may for example include residue ranging in height from short to tall. As the seeder/planter is translated forward, for example by being pulled behind a tractor (not shown) in direction C, mower 120 produces mulch S' for processing by coulter discs 26 on a correspondingly reduced number of row units 1'. For example, in the example of the illustrated embodiment having a single mower 120, an array of four row units 1' are mounted across the seeder/planter 200. Agricultural product is fed into the row units' corresponding metering devices 62. The metering devices 62 may, in some embodiments, be chain driven via a spiked ground wheel (not shown), such that the metering devices 62 are operated using the forward motion of the reduced scale seeder/planter 200. In other embodiments, the metering devices 62 may be individually controlled with a dedicated electric motor for each metering device, or the metering devices 62 may be controlled as a group with a single electric motor operating several metering devices in a bank. in such embodiments, the electric motor or motors may be contained in motor compartment 62. The row units 1' otherwise operate, and structurally are, as described herein in the other illustrated embodiments employing row units 1.

Mower 120 may be mounted forward of row units 1' on tow bar 124. At its forward end 124*a*, the tow bar 124 is connected to the tractor. The rearward end 124*b* of tow bar 124 is mounted to the seeder/planter frame 126 supporting row units 1' and hoppers 122. In some embodiments the mower deck 120*a*, which provides a housing containing the horizontally rotating cutting assembly 135, may be coupled to tow bar 124 by a parallelogram linkage system 128 to be elevated or lowered while mower deck 120*a* remains level. In one embodiment, the power take-off (not shown) on the tractor may be used to power the mower 120 and thereby rotate the mower's cutting assembly 135 within mower deck 120*a*. In another embodiment, the mower's horizontally rotating cutting assembly 135 may be driven by a motor 133; and if the motor 133 is a hydraulic motor, the system may also include an oil pump and oil reservoir 132 in communication with the motor 133.

Figure 21A:
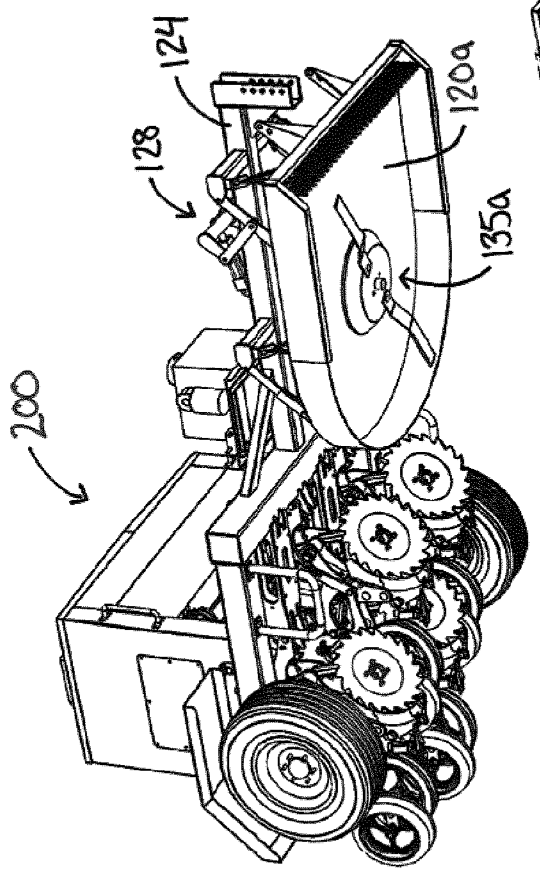
FIGS. 21A to 21C are bottom perspective views of the reduced-scale seeder/planter of FIG. 20, showing different embodiments of the cutting assembly of the mower.
Figure 21B:
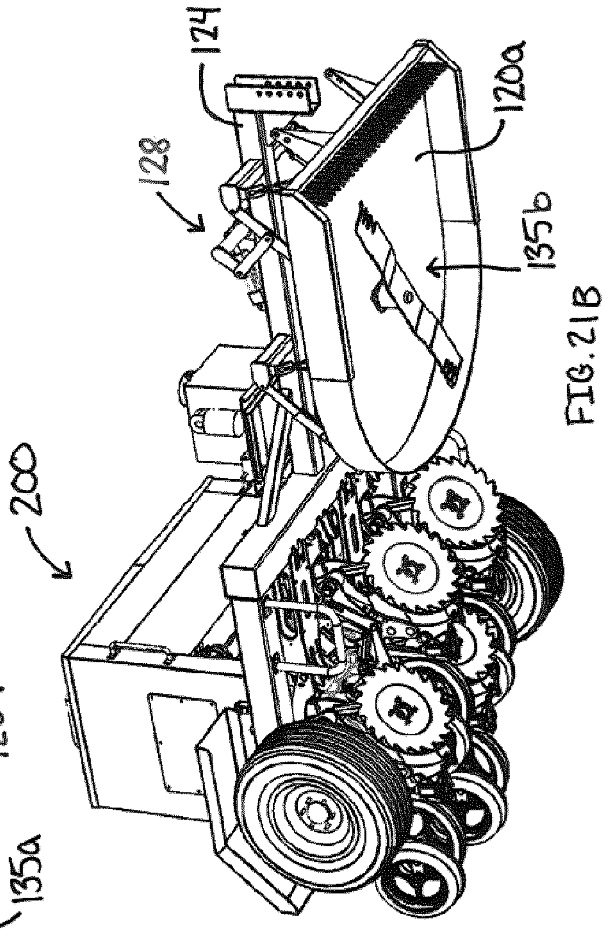
Figure 21C:
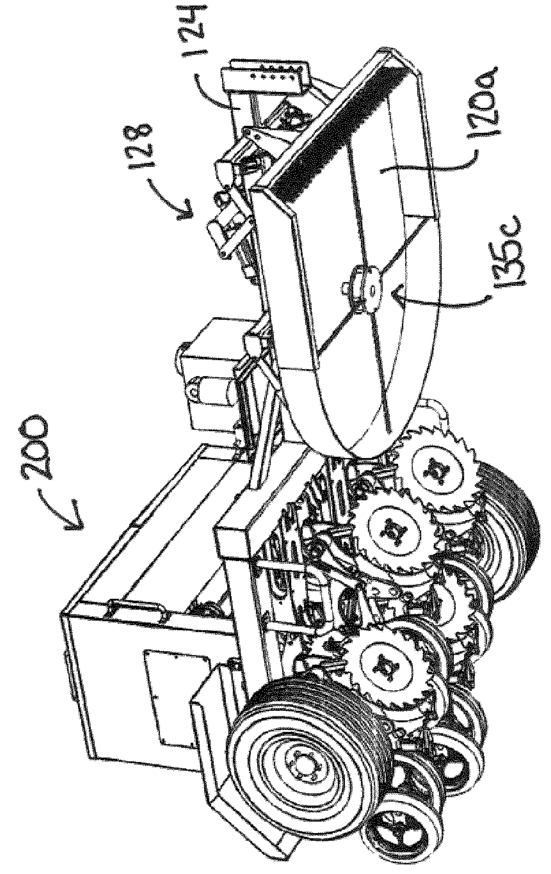

As best viewed in FIGS. 21A to 21C, the cutting assembly 135 may include, for example, a horizontal blade assembly 135*a*, a serrated blade assembly 135*b*, a mulching chain assembly 135*c*, or any combination thereof. The cutting assemblies 135*a*, 134*b* and 135*c* may be, for example, interchangeable accessories for the mower 120 which may be used to adapt the mower 120 to the particular crop residue S to be mulched. For example, tougher stalks in crop residue S may be best mulched by the serrated blade assembly 135*b*.

Figure 22A:
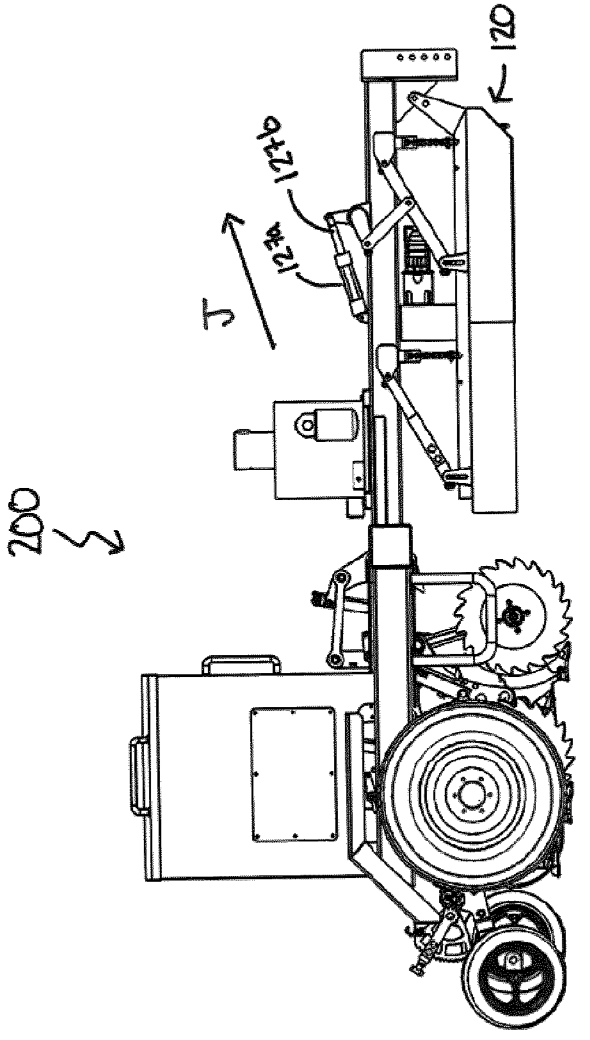
FIG. 22A is a side elevation view of the reduced-scale seeder planter of FIG. 20, showing the mower in an elevated position.
Figure 22B:
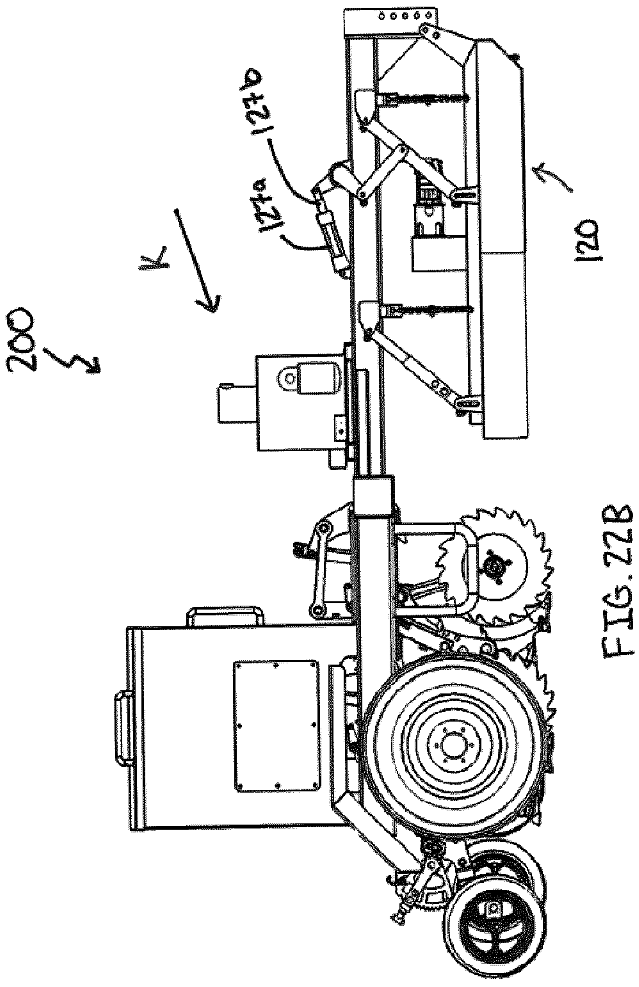
FIG. 22B is a side elevation view of the reduced-scale seeder planter of FIG. 20, showing the mower in a lowered position.

An actuator 127, which may be remotely actuated, is coupled to bell crank 128*a* to actuate linkage system 128 via bell crank linkage 128*b* to raise, lower or hold steady the mower deck 120*a*. For example, when the actuator 127 is extended in direction J, the actuator cooperates with the parallelogram linkage system 128 to lift the mower 120 upwardly in an elevated position as shown in FIG. 22A. When the actuator 127 is retracted in direction K, the actuator cooperates with the parallelogram linkage system 128 to lower the mower 120 into a lowered position, as shown in FIG. 22B. Mower 120 is supported in its selectively elevated or lowered position by linkage system 128. Because linkage members 128*c* are spaced apart laterally and equally on opposite sides of tow bar 124, the mower deck 120*a* is laterally stabilized. Flexible stabilization supports, which for example may be stabilization chains or cables 128*e*, may further laterally stabilize the mower deck 120*a* while also allowing for some lateral movement or sway as the mower 120 travels over uneven crop residue S. Furthermore, the linkage members 128*c* may include coupling pins 125*a* for coupling the linkage members 128*c* to a linkage flange 128*d* on the mower deck 120*a*. The linkage flange 128*d* includes vertical slots 125*b*, and the pins 125*a* may slide in a vertical direction along the slots 125*b*, thus allowing for some vertical movement of the mower deck 120*a* as the mower travels over the crop residue S. Tow bar 124 and frame 126 are supported on wheels 130 on opposite sides of frame 126.

The cutting height of the mower above the ground is not precise or critical if, for example, the mower is positioned approximately two to three inches above ground to mulch the crop residue.

The above description of FIGS. 20 to 22B, of an embodiment of a mower mounted forwardly of an array of row units, provides an example of how a mower may be used to mulch a crop residue of varying heights prior to opening a furrow with a coulter wheel and an opener. However, it will be appreciated that the particular arrangement of a mower and array of row units, described above, is not intended to be limiting, and that variations as would be known to a person skilled in the art are intended to be included in the present disclosure. For example, the mower may be elevated and lowered using mechanical means other than the parallelogram linkage assembly operatively coupled to an actuator described above. The mower may not include a mower deck and may not be mounted to a tow bar. The array of row units 1' may include more, or fewer than, four row units. Such variations, and other variations known to a person skilled in the art, are intended to be included in the scope of the present disclosure.

Figure 20:
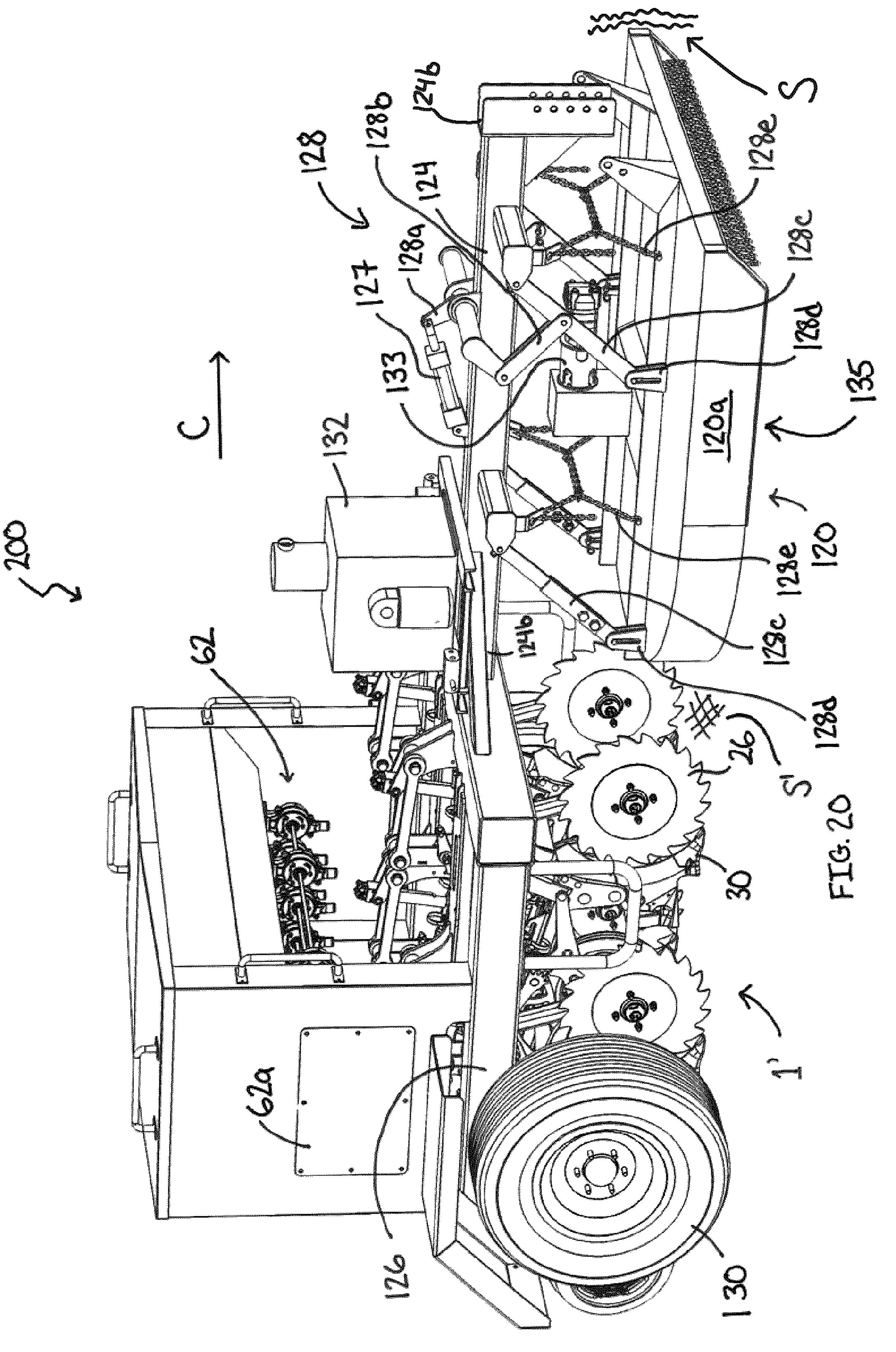
FIG. 20 is a front perspective view of an array of row units on a reduced-scale seeder/planter, the array of row units including the system of FIG. 1 and a mower mounted ahead of the seeder/planter directly ahead of the row units in the direction of travel.

Although shown elevated in FIG. 20, it will be understood that during operation the array of row units 1' is lowered to engage the openers 30 and coulter discs 26 with the ground so that the coulter discs 26 may effectively process the mulch S' much as they would normally process residue R as defined herein. Without the pre-processing of residue S by mower 120 to create mulch S', the long and sometimes stringy residue S, as for example from a rice crop, would quickly foul the coulter discs 26, negatively impacting the performance of the openers distributing agricultural product into the ground. Applicant has observed that the pre-processing by mower 120 to produce mulch S' creates a mulch of smaller pieces that covers what is sown into the ground after the opener 30 passes and the mulch S' has settled. Once the mulch S' settles and packs it provides a thick coat that protects the soil, for example from moisture loss, and thereby protects the seeds. The cover provided by the settled mulch may, it is thought, reduce disease, and support the seedlings as they grow.

What is claimed is:

1. A residue management system for a row unit assembly, the system comprising:

a coulter disc rotationally mounted on a spring-tensioned swing arm, the swing arm resiliently urged by a spring into a default position where the coulter disc is closely adjacent a corresponding opener blade, the swing arm pivotally mounted to a frame of the row unit assembly, the opener blade comprising a leading edge and a residue guide, the residue guide extending upwardly from an upper end of the leading edge, the leading edge and the residue guide together forming an upwards curved edge, the curved edge being substantially concentric with and closely adjacent to the coulter disc when the swing arm is in the default position;

wherein, when the row unit assembly is travelling in a forward direction with the opener blade and coulter disc engaging a ground, the swing arm maintains the coulter disc in the default position at a default distance between an outer diameter of the coulter disc and the curved edge; and wherein, as the coulter disc rotates, debris including mulched residue on the ground is opened by the coulter disc in line with the trailing opener blade, with debris carried by teeth of the coulter disc upwardly along the curved edge, the debris then falling away from the residue guide; and wherein, when the debris includes a large object having a dimension exceeding the default distance and the large object enters between the coulter disc and the leading edge of the opener blade, the swing arm swings the coulter disc away from the opener blade against the return biasing force of the spring until the large object has cleared from between the coulter disc and opener blade, after which the spring urges the swing arm to return the coulter disc to the default position adjacent the curved edge.

2. The system of claim 1, wherein the residue guide is integrally formed with the leading edge of the opener blade.

3. The system of claim 1, wherein the residue guide is manufactured of a resilient plastic, and wherein when debris comes into contact with the residue guide, the residue guide flexes and then returns to its original position so as to push the debris laterally away from the coulter disc.

4. The system of claim 1, further comprising an adjustment mechanism for adjusting the default position of the coulter disc relative to the opener blade and the ground, the adjustment mechanism comprising an adjustable support adjustably mounted to the frame of the row unit assembly, wherein an opener assembly of the row unit assembly is mounted to the adjustable support and comprises the opener blade mounted to an opener blade support; and wherein the default position of the coulter disc relative to the opener blade and the ground is adjustable by actuating the adjustment mechanism so as to move the adjustable support and the opener assembly relative to the coulter disc.

5. The system of claim 4, wherein the adjustable support comprises a vertical adjustment bar having lower and upper ends, the lower end of the vertical adjustment bar mounted to the opener blade support and the upper end of the vertical adjustment bar supporting a shim stack, the shim stack comprising a plurality of shims and sandwiched between the row unit assembly frame and the upper end of the vertical adjustment bar; and wherein when at least one shim is removed from the shim stack, the vertical adjustment bar and the opener assembly move upwardly towards the row unit assembly frame so as to position the swing arm and coulter disc downwardly towards a tip of the opener blade, thereby increasing a penetration depth of the coulter disc, and wherein when at least one shim is added to the shim stack, the opener assembly moves downwardly away from the row unit assembly frame so as to position the swing arm and coulter disc upwardly away from the tip of the opener, thereby decreasing the penetration depth of the coulter disc.

6. The system of claim 5, wherein the penetration depth is maintained at substantially 0.38 inches by adding shims to the shim stack or removing shims from the shim stack.

7. The system of claim 5, wherein each shim of the plurality of shims includes an off-center aperture, the shim stack held in position by a spring loaded pin inserted through each aperture of each shim of the shim stack and through a bolt hole mounted onto the row unit assembly frame adjacent the upper end of the vertical adjustment bar, wherein each shim is removed from or added to the shim stack sandwiched between the upper end of the vertical adjustment bar and the frame by rotating a main body of the shim about the spring loaded pin inserted through the off-center aperture so as to position the main body of the shim away from or on to the shim stack.

8. The system of claim 4, wherein a default stop is adjustable so as to adjust the default position of the coulter disc relative to the leading edge of the opener blade and the residue guide, wherein retracting the default stop away from the adjustment mechanism adjusts the default position of the coulter disc closer to the curved edge of the opener blade and the residue guide, and wherein extending the default stop towards the adjustment mechanism adjusts the default position of the coulter disc farther away from the curved edge of the opener blade and the residue guide.

9. The system of claim 1, further comprising at least one mower comprising a mower deck, the mower mounted ahead of the row unit assembly to provide the mulched residue by reducing to a mulch size upstanding crop residue in the path of the mower and the row unit assembly, the crop residue having a range of heights, including a crop residue height greater than a mower deck height.

10. The system of claim 9 wherein the mower is mounted on a parallelogram linkage for stable elevation and lowering of the mower by a selectively actuable actuator cooperating with the parallelogram linkage.

11. The system of claim 9 wherein the mower is a deck housing mower having at least one horizontally rotating cutting assembly within the deck housing.

12. The system of claim 11 wherein the horizontally rotating cutting assembly is selected from a group comprising: a cutting blade, a serrated cutting blade, mulching chains.

13. The system of claim 10 wherein the mower is further stabilized with one or more flexible supports suspending the mower from a tow bar mounted to the row unit frame.

14. A method for managing crop residue comprising:

a) providing the residue management system of claim 9 operatively coupled behind a self-propelled agricultural prime mover, b) traversing the prime mover and residue management system over the crop residue while operatively engaging the mower, coulter disc and opener blade with the ground so as to mulch the crop residue ahead of, for processing by, the coulter disc.

15. The method of claim 14 wherein the prime mover is a tractor.

* * * * *